(12) United States Patent
Rusch

(10) Patent No.: US 6,435,783 B1
(45) Date of Patent: Aug. 20, 2002

(54) VARIABLE RADIUS NOTCHING MACHINE

(76) Inventor: Christopher J. Rusch, 1920 13th St., Two Rivers, WI (US) 54241

( * ) Notice: Subject to any disclaimer, the term of this patent is extended or adjusted under 35 U.S.C. 154(b) by 0 days.

(21) Appl. No.: 09/712,614

(22) Filed: Nov. 13, 2000

Related U.S. Application Data

(60) Provisional application No. 60/165,419, filed on Nov. 13, 1999.

(51) Int. Cl.[7] .................................................. B23C 3/00
(52) U.S. Cl. ...................... 409/132; 409/167; 409/200; 409/225
(58) Field of Search ............................... 29/33 T, 33 D; 409/163, 167, 166, 165, 205, 199, 200, 131, 132; 451/246

(56) References Cited

U.S. PATENT DOCUMENTS

| | | | | |
|---|---|---|---|---|
| 3,163,085 A | * | 12/1964 | Wishing | 409/205 |
| 3,342,107 A | * | 9/1967 | Margolien | 409/205 |
| 4,194,422 A | | 3/1980 | Williams | 83/581 |
| 4,712,954 A | * | 12/1987 | Campolito | 409/163 |
| 5,437,570 A | * | 8/1995 | Landhuis | 451/296 |
| 5,964,137 A | | 10/1999 | Jung | 83/620 |

FOREIGN PATENT DOCUMENTS

| JP | 60-207709 | * | 10/1985 | 29/33 T |
|---|---|---|---|---|

* cited by examiner

Primary Examiner—William Briggs
(74) Attorney, Agent, or Firm—Andrus, Sceales, Starke & Sawall, LLP

(57) ABSTRACT

The present invention relates to a notching machine for forming a radial notch into a workpiece, such as the side or end of a tube, pipe or rod. The notching machine includes a workpiece positioning assembly, a hub and spindle assembly, an offset mechanism, a hub drive mechanism and a spindle drive mechanism. The workpiece positioning assembly includes a cross slide table and a vice for gripping and positioning the workpiece into a desired position. The hub and spindle assembly includes a hub that is rotatably mounted on a hub rotation assembly. The hub rotation assembly rotates about a central axis of rotation. The hub carries a spindle and its tool. The hub, spindle and tool share a common axis. This common axis is the axis of rotation of the spindle and tool. The hub, spindle and tool can be aligned in an in-line or offset manner with respect to the central axis. The offset mechanism includes an offset adjustment screw that offsets the common axis of the hub, spindle and tool a desired distance from the central axis. When the hub and spindle are offset and rotated about the central axis, the tool orbits about the central axis through a desired circular path of travel. The radius of the notch cut by the tool is adjusted by adjusting the amount of offset. The hub drive mechanism is hand driven by the machine operator via a hand wheel. The spindle drive mechanism is driven by an electric motor that is directly linked to the spindle. The motor is secured to a frame of the machine via a torque arm.

19 Claims, 39 Drawing Sheets

VARIABLE RADIUS NOTCHING MACHINE

This appln claims benefit of Prov. No. 60/165,419 filed Nov. 13, 1999.

TECHNICAL FIELD OF THE INVENTION

The present invention relates to a notching machine having a rotation assembly with a central axis of rotation, the rotation assembly carrying a hub, spindle and tool that share a common axis and are selectively offset to orbit around the central axis to permit the tool to form notches of varying radii into a workpiece such as a tube, pipe or rod.

BACKGROUND OF THE INVENTION

Many modern buildings and products utilize interconnected pipes, tubes and rods. Buildings frequently use tubes to form handrails, bicycle racks and other fixtures as shown in FIG. 1. These handrails are formed by a variety of different diameter tubes. The end of one tube is joined to the sidewall of another. The ends of the tubes are notched to form a smooth joint where one tube is welded or otherwise secured to the other. Chemical and food processing plants incorporate elaborate piping systems to efficiently move and dispense fluids throughout the plant. A portion of such a piping system is shown in FIG. 2. One pipe has a hole in its sidewall and the other pipe is angled so that the fluid in the pipe will smoothly flow into the other. The end of the pipe is notched to flushly mate against the sidewall of the other to help achieve a smooth flow of fluid through the piping system. Manufacturing plants produce a wide variety of consumer products formed from interconnected tubes, such as lawn furniture, play ground equipment, automobile chassis, airplane fuselages scaffolding and crane booms.

To assemble these building fixtures, piping systems and consumer products, a number of tubes, pipes, rods or other types of workpieces are cut to their appropriate length. A notching machine is then used to cut or otherwise form a notch into one or both ends of each tube or workpiece. These tubes are then assembled to form the desired product. The notched end of one part smoothly mates with and is welded or otherwise joined to the sidewall of another part to form an integral fixture, pipe system or product. Conventional notching machines typically incorporate a vice that holds the tube, and a spindle that holds and rotates a tool about its axis. The common axis of this spindle and tool remains fixed, or moves in a linear direction toward the tube to form a notch in its end. Each notch has the same radius as the tool used to form the notch.

A problem with conventional notching machines is their excessive operating costs. Each tool has a given diameter or radius and is only capable of forming a notch having that same radius. A full contingent of twenty or more different radius tools may be needed to form the various notches required at a given construction site of manufacturing plant. This dramatically increases the operating cost of the machine because each tool costs between $100 and $1,000. Yet, a single handrail, piping system, or product may require a variety of different diameter tubes, pipes or rods that must be notched to suit a particular joint geometry. This problem is compounded by the fact that construction sites and manufacturing plants frequently have several different projects or product runs going simultaneously. One project may require several different notch sizes and shapes, and each notch may need to be formed by a cutting or milling tool and then finished by a grinding or polishing tool. As a result, the notching machine must include a full contingent of each type of tool, which multiplies the operating costs associated with the machine.

An additional problem with conventional notching machines is their inefficiency. The machine operator must turn off the machine or stop production to change the tool each time a different radius notch or opening is cut. This constant interruption in production results in significant down time and reduced worker and machine efficiency.

A further problem with conventional notching machines is their limited capabilities. Any given notching machine may only be able to make one or two types of notches or joints. While one machine may be capable of forming a notch in the end of a tube, that machine may not be suitable for performing a plunge cut into the tube. The machine may also be incapable of forming a snap fit type notch into the tube. As a result several expensive machines are required to perform the various types of work needed at modern construction sites and manufacturing plants.

A still further problem with conventional notching machines is that they are heavy, bulky and awkward to move. Yet, some projects or product runs may require hundreds of individual component parts that must be brought to the notching machine. Hauling bulky quantities of parts from one end of a construction site or plant to another is not only labor intensive, but can also result in needless injury to the workers.

The present invention is intended to solve this and other problems.

BRIEF DESCRIPTION OF THE INVENTION

The present invention relates to a notching machine for forming a radial notch into a workpiece, such as the side or end of a tube, pipe or rod. The notching machine includes a workpiece positioning assembly, a hub and spindle assembly, an offset mechanism, a hub drive mechanism and a spindle drive mechanism. The workpiece positioning assembly includes a cross slide table and a vice for gripping and positioning the workpiece into a desired position. The hub and spindle assembly includes a hub that is rotatably mounted on a hub rotation assembly. The hub rotation assembly rotates about a central axis of rotation. The hub carries a spindle and its tool. The hub, spindle and tool share a common axis. This common axis is the axis of rotation of the spindle and tool. The hub, spindle and tool can be aligned in an in-line or offset manner with respect to the central axis. The offset mechanism includes an offset adjustment screw that offsets the common axis of the hub, spindle and tool a desired distance from the central axis. When the hub and spindle are offset and rotated about the central axis, the tool orbits about the central axis through a desired circular path of travel. The radius of the notch cut by the tool is adjusted by adjusting the amount of offset. The hub drive mechanism is hand driven by the machine operator via a hand wheel. The spindle drive mechanism is driven by an electric motor that is directly linked to the spindle. The motor is secured to a frame of the machine via a torque arm.

An advantage of the present notching machine invention is its low operating cost. Although a cutting, milling, grinding or polishing tool may have a single given diameter or radius, the present notching machine is able to use that tool to cut or otherwise form notches having a variety of radii. This is accomplished by varying the distance the spindle is offset from the central axis of the hub rotation assembly. For example, a notching machine with a maximum offset of one inch can use a single one inch diameter tool to form notches varying between one to three inches. Instead of needing a full contingent of twenty or more tools, only two or three tools may be needed to form all the various radii notches required by a wide variety of fixtures, piping systems or products. This benefit is multiplied at construction sites and manufacturing plants that use numerous types of tools. Not only are fewer cutting tools needed, but fewer milling, grinding or polishing tools are needed as well.

Another advantage of the present notching machine invention is its versatility. The notching machine is designed to hold and machine a wide variety of workpieces, such as tubes, pipes and rods. The workpiece can have a round, square, rectangular of other cross sectional shape. The notching machine can also form a notch or opening in the end or side of the workpiece. The workpiece can be held firmly to the frame of the machine by a cross slide table and vice. In some situations, only the movement of the tool through its orbiting path of travel is need to create the desired notch or opening. In other situations, the tool does not move, and the workpiece is moved along a desired path of travel by the cross slide table. In other situations, a combination of tool and workpiece movement are combine to produce the desired notch or opening. For example, the present notching machine can form both notches and plunge cuts into a tubular workpiece. The machine is also capable of forming a snap fit type notch into the end of a tube, pipe or rod. This versatility allows a single notching machine to be used for a wide variety of fixtures, piping systems and products.

A further advantage of the present notching machine invention is its portability. The compact size and relatively light weight design of the present notching machine achieves a degree of portability that allows it to be brought directly to the area of the construction site or manufacturing plant where the fixture, piping system or product is being made or installed. The expense and danger of hauling large quantities of bulky or unwieldy workpieces through a crowded construction site or manufacturing plant are eliminated or dramatically reduced. The machine is specifically designed to fit into the service elevators of most construction sites and manufacturing plants. This versatility and portability also combine to dramatically reduce the operating cost associated with the present notching machine.

A still further advantage of the present notching machine is its precision and safety. The notching machine includes a hub drive mechanism that is manually operated by a hand wheel. The operator is able to control the rate of each cut to ensure the quality of each cut. The hub drive mechanism also has a one-way clutch that only permits the tool to be advance into the workpiece in the same rotational direction as the tool. This one-way clutch helps prevent the tool from grabbing or biting into the workpiece as the workpiece is being cut. The clutch also prevents the machine operator form inadvertently feeding the tool into the workpiece from the wrong direction, which can cause the tool to bit into the workpiece and break the tool. This digging or biting can cause the tool to jump or rapidly accelerate through the workpiece, which can damage the workpiece and injure the machine operator.

Other aspects and advantages of the invention will become apparent upon making reference to the specification, claims and drawings.

DESCRIPTION OF THE PREFERRED EMBODIMENTS

Figure 1:
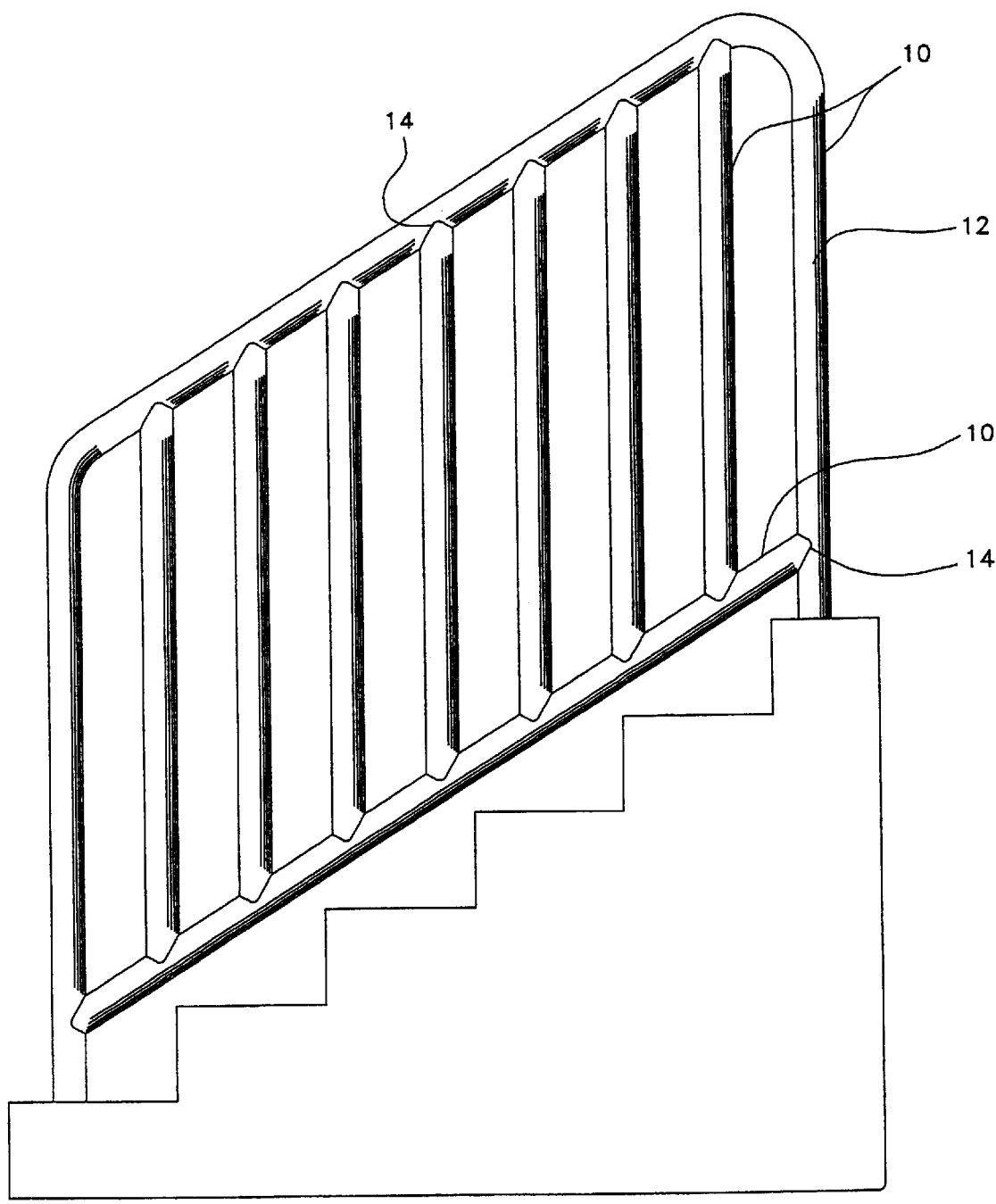
FIG. 1 is an elevated view of a conventional stairway railing formed by a number of tubes, several of which have notched ends.
Figure 2:
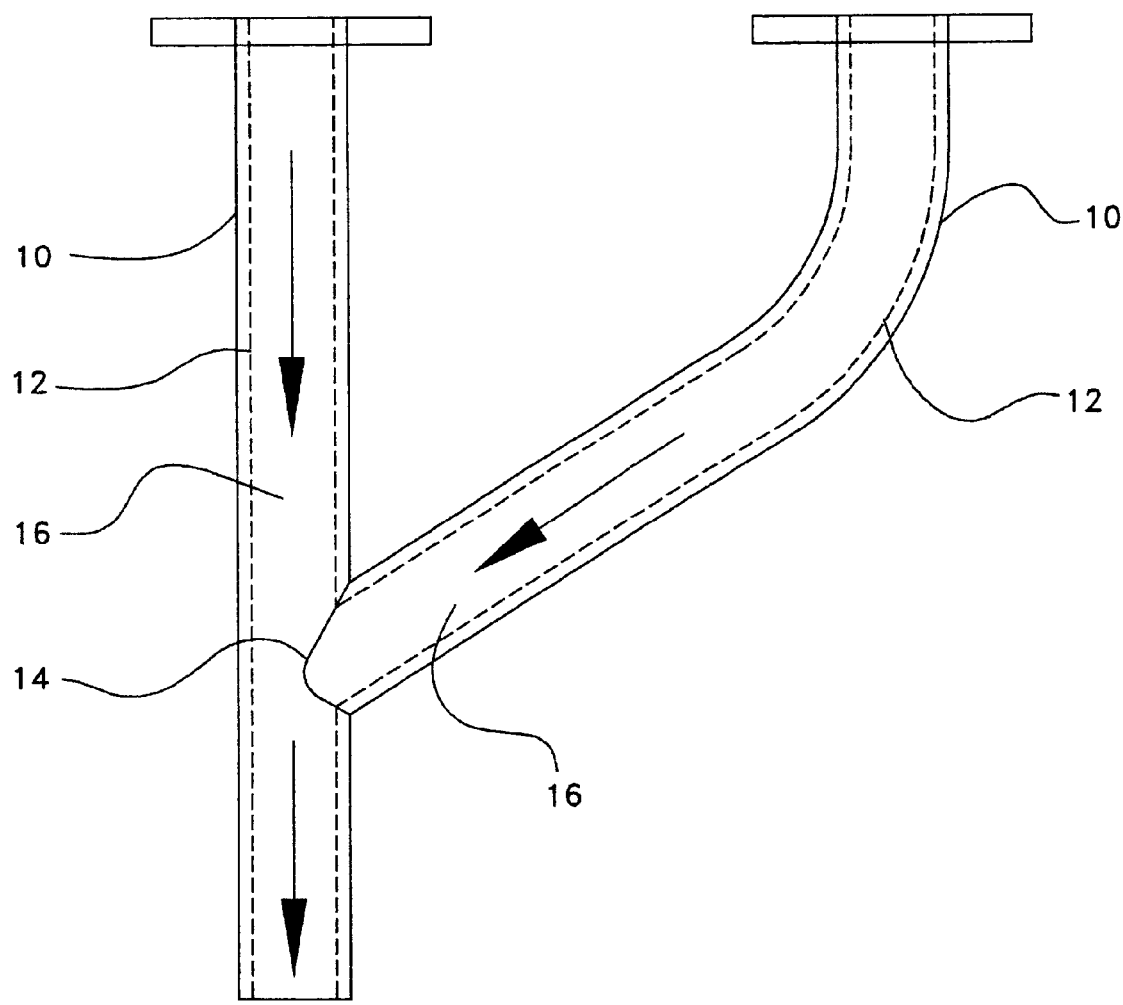
FIG. 2 is a plan view of a conventional fluid piping system having a main pipe with an opening in its sidewall that is intersected by an angled feed pipe with a notched end.
Figure 3:
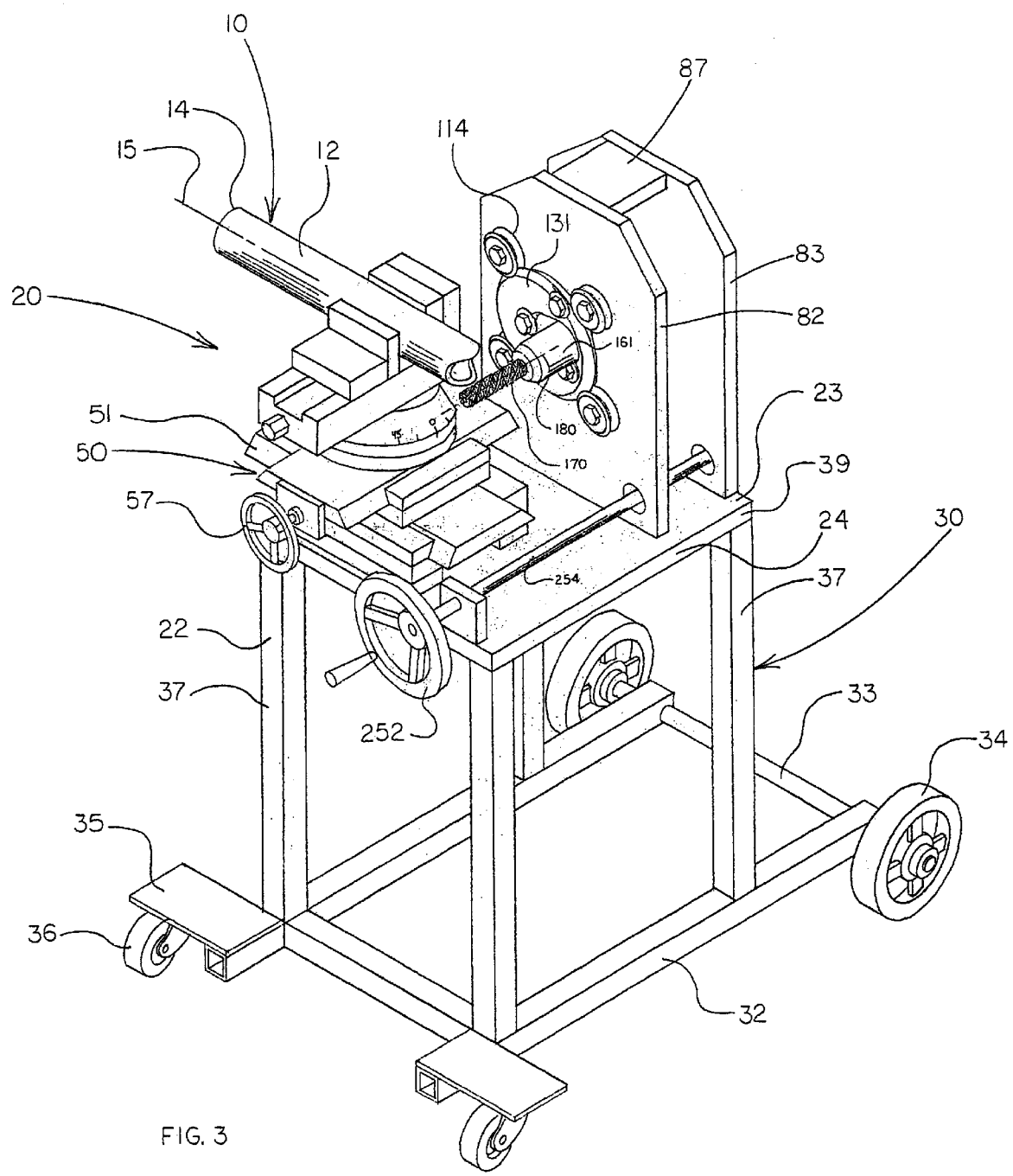
FIG. 3 is a perspective view of the inventive oscillating notching machine showing a large diameter tube held firmly in place by a positioning table and vice, with the tube having a notch that has been formed in its end by a smaller diameter tool mounted on an orbiting spindle.

While this invention is susceptible of embodiment in many different forms, the drawings show and the specification describes in detail a preferred embodiment of the invention. It should be understood that the drawings and specification are to be considered an exemplification of the principles of the invention. They are not intended to limit the broad aspects of the invention to the embodiment illustrated.

The present invention relates to a machine for notching a commercial grade tube or pipe 10. The tube 10 has a sidewall 12, and a length defined by its ends 14. The sidewall 12 has a circular cross sectional shape defined by its inside and outside surfaces. The inside and outside surfaces define the inside and outside diameters of the tube 10. The tube 10 has a longitudinal axis 15. The inside surface of the tube 10 defines an open interior 16. The tube 10 is preferably made of metal or plastic, but could be another solid cuttable materials. While the workpiece 10 is generally shown and described herein as being a tube, it should be understood that the workpiece could take other forms and shapes, such as pipe or a solid rod, without departing from the broad aspects of the invention. The workpiece can have a round, square, rectangular of other cross sectional shape without departing from the broad aspect of the invention.

The variable radius notching machine is shown in FIGS. 3–8 and is generally referred to by reference number 20. The notching machine 20 has a front 22, a rear 23, and two sides 24 and 25. The notching machine 20 is comprised of several components that are secured to its frame 30. A lower portion of the frame 30 forms a chassis 32 for moving the machine 20. The chassis 32 includes a rear axle 33 with relatively large wheels 34. The front of the chassis 32 has two casters 35 with smaller wheels 36. The notching machine 20 can be transported by maintaining each of the wheels 34 and 36 in contact with the ground or a supporting surface, or the machine can be tilted onto just its larger wheels 34 for more maneuverability. Each of the front and rear corners of the frame 30 includes a riser 37 that supports an upper table or base plate 39. The main components forming the notching machine 20 are rigidly secured to the base plate 39. The chassis 32, risers 37, upper frame 38 and base plate 39 are robustly designed to handle and support the weight of the notching machine 20 and the tubing workpiece 10 held by the machine during use.

One component of the notching machine 20 is a workpiece positioning assembly 50. The positioning assembly 50 is secured toward the front 22 of the base plate 39. The positioning assembly 50 includes a cross slide table 51. The cross slide table 51 has a lower gib assembly 52 with a gib 53 that is operated by a hand wheel 54 to move the gib in a side 24 to side 25 or Y-Y direction. An upper gib assembly 55 has a gib 56 that is operated by a hand wheel 57 to move in a front 22 to rear 22 or X-X direction. The top of the cross slide table 51 is formed by a rigid table 59. The hand wheels 54 and 57 are used to move the table 59 forward-and-back and from side-to-side with respect to the base plate 39 of the frame 30 and the other components of the machine 20 as discussed below. The top surface of the table 59 is roughly parallel to and only about five-inches from the top of the base plate 39 to help the cross slide table 51 resist the forces and torques exerted on it when the tubes 10 are being machined.

The positioning assembly 50 includes a vice 61 that is rigidly secured to the table 59 of the cross slide table 51. The base portion of the vice 61 includes a rotation assembly 62. The rotation assembly 62 allows the vice 61 to rotated atop the table 59 so that the workpiece 10 can be oriented in any desired angular direction relative to the table 59, and thus the tool of the notching machine 20. The vice 61 has two jaws 64 and 65 for gripping the tubular workpiece 10. One jaw 64 remains fixed to the table 59. The other jaw 65 is movable and can be advanced toward or away from the fixed jaw 64 by a hand wheel 67. The jaws 62 and 64 of the vice 61 can preferably separate four inches apart to receive a tube or workpiece 10 with this outside diameter. The vice 61 also includes a height adjustment mechanism for adjusting the height of the jaws 64 and 65 relative to the table 59. The vice 61 is preferably common milling machine vice. Although the workpiece positioning assembly 50 is shown and described to be a cross slide table 51 and a vice 61, it should be understood that other types of workpiece positioning devices could be used without departing from the broad aspect of the invention.

Figure 9:
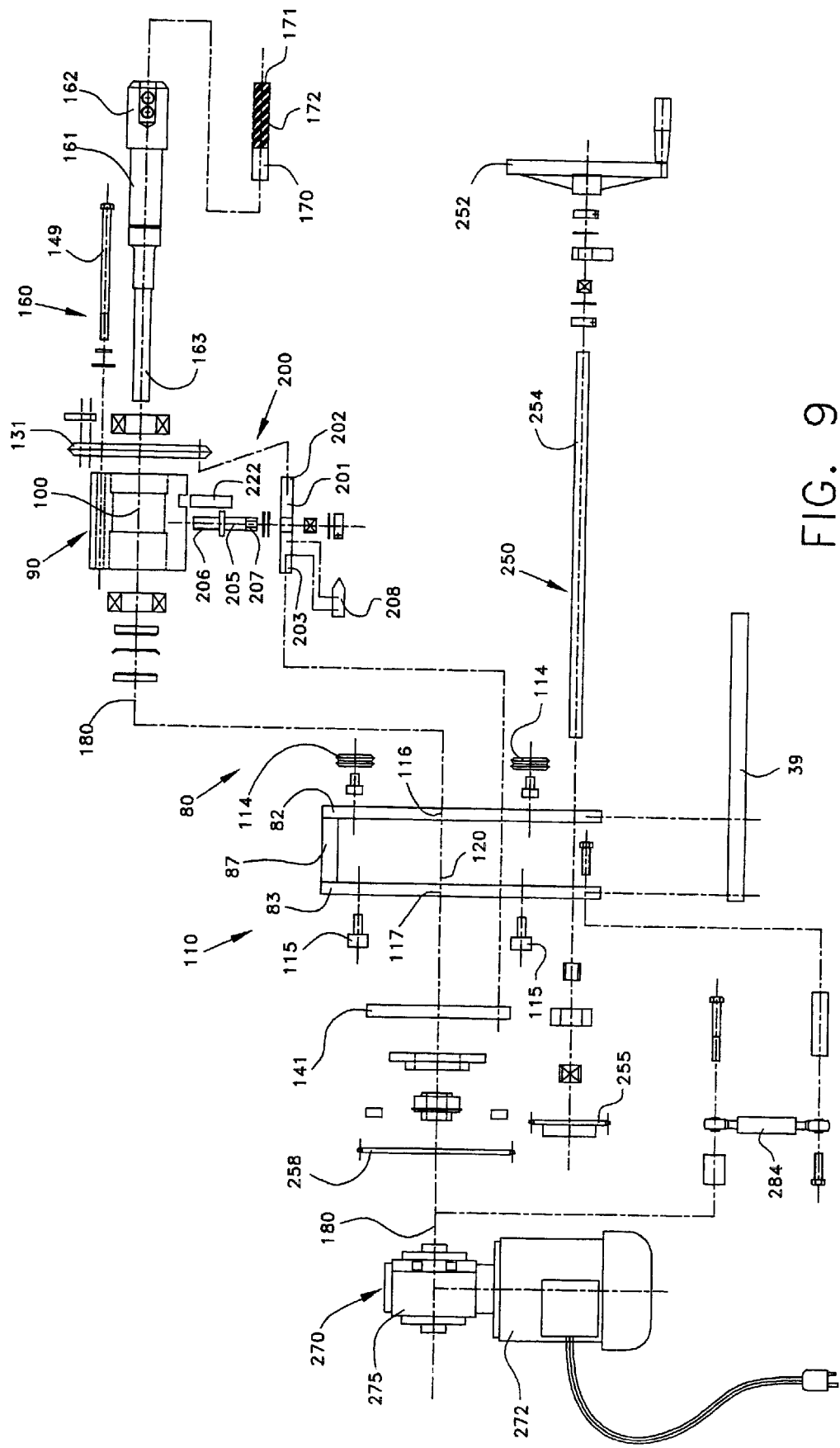
FIG. 9 is an exploded view of the hub and spindle assembly, the spindle drive mechanism and the hub drive mechanism.

Another component of the notching machine 20 is its hub and spindle assembly 80, which is shown in exploded view in FIG. 9. The hub and spindle assembly 80 a pair of mounting plates 82 and 83 positioned toward the rear 23 of the machine 20. The lower end of each mounting plate 82 and 83 is bolted or otherwise rigidly secured to the base plate 39. The metal plates 82 and 83 are substantially parallel and spaced about six inches apart. Each mounting plate 82 and 83 is about ¾ inch thick, 12 inches wide and 17 inches tall. The plates 82 and 83 are robustly designed to carry the weight of the hub and spindle assembly 80 as well as the other components attached to the plates. Each mounting plate 82 and 83 has a nine inch diameter opening 86 formed through a middle section toward a top of the plate. The mounting plates are joined at their top by a tie bar 87.

Figure 10A:
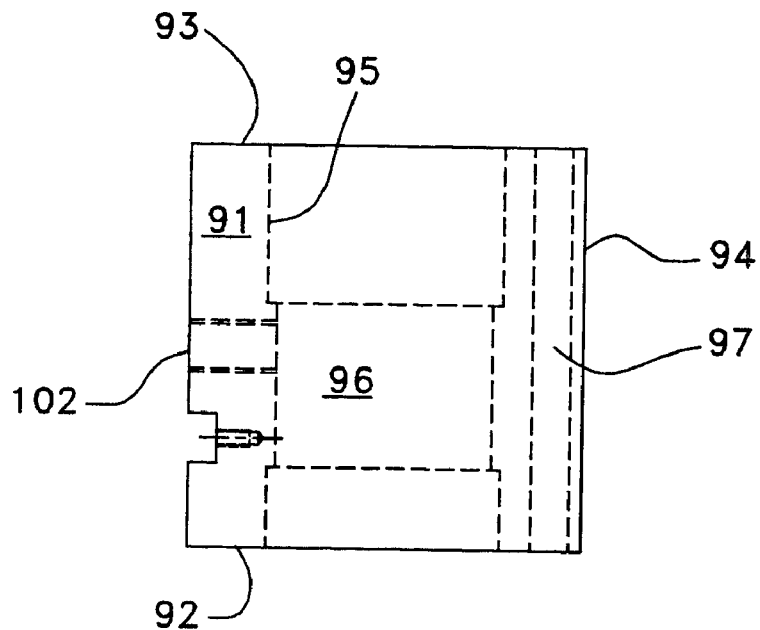
FIG. 10a is a side view of the hub.
Figure 10:
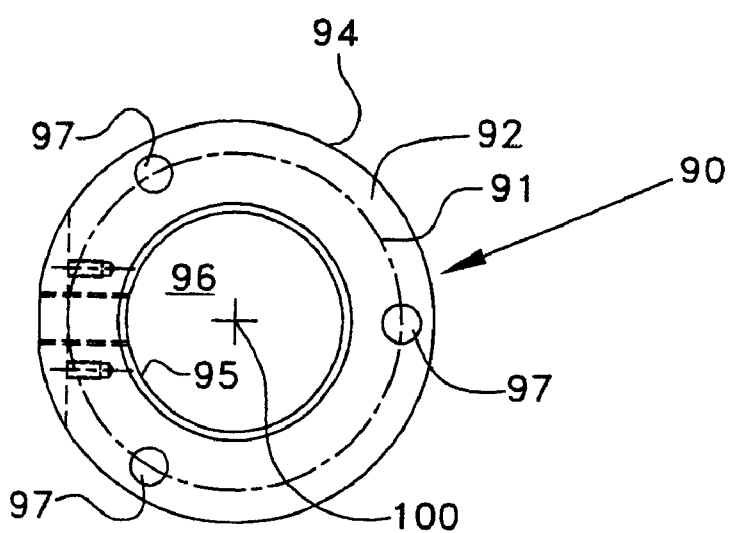
FIG. 10 is a front view of the hub showing its three equidistantly spaced holes for receiving the bolts that secure it to the guide disc and the support disc.
Figure 11:
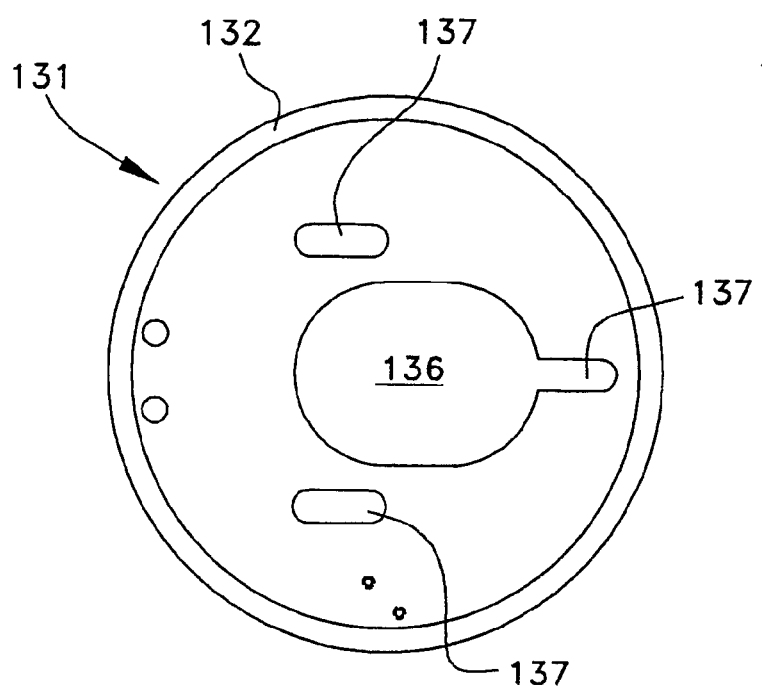
FIG. 11 is a front view of the guide disc showing its central opening, offset slots and bolt holes.
Figure 11A:
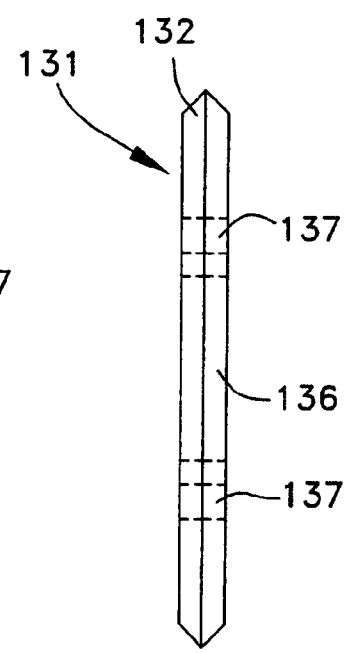
FIG. 11a is a side view of the guide disc.
Figure 12:
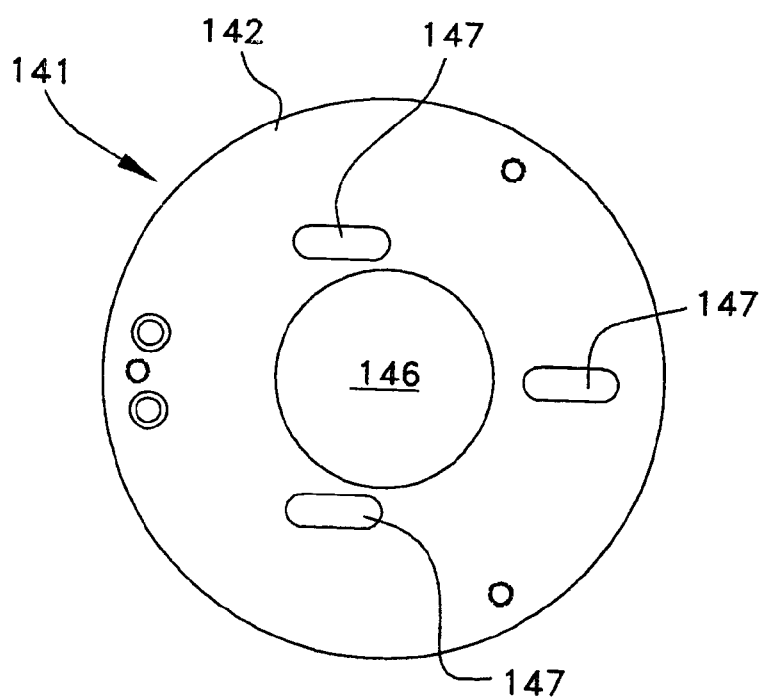
FIG. 12 is a front view of the support disc showing its central opening, offset slots and bolt holes.
Figure 12A:
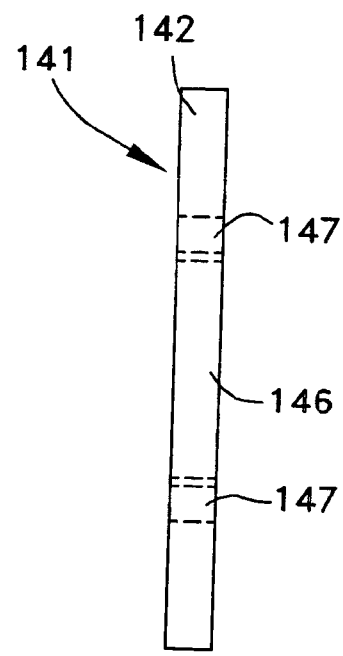
FIG. 12a is a side view of the support disc.

The hub and spindle assembly 80 includes a hub assembly or hub 90, as best shown in FIGS. 10 and 10a. The hub 90 has a main body formed by a generally round outer wall 91 with ends 92 and 93. The wall 91 has an outer surface 94 and an inner surface 95 that defines an open cavity 96 that extends from one end 92 of the hub to the other 93. The hub 90 has a diameter of about six inches and a length of about six inches. The body of the hub 90 and its interior cavity 96 are substantially symmetrical about and define its center axis 100. The body or wall 91 has three bolt holes 97 that extend from one end 92 to the other 93. The hub 90 is positioned between each mounting plate 82 and 83. Each end 92 and 93 of the hub 90 freely extends through one of the nine inch diameter openings formed in the mounting plates 82 and 83. The hub also includes a threaded hole or opening 102, as discussed below.

The hub 90 is rotatably secured to the mounting plates 82 and 83 via a rotation assembly 110. The rotation assembly 110 includes four guide rollers 114 and three cam rollers or followers 115. Each guide roller 114 has a shaft that is rigidly secured to the front mounting plate 82 and extends from the front surface of the mounting plate. The shaft is provided with a bearing to enable the guide roller 114 to rotate. The guide rollers 114 are spaced equidistantly around the opening 86 of the front mounting plate 82 to define a center point 116 at about the center of the opening. Each guide roller 114 is spaced about 4½ inches from this center point 116 of the opening 86 in the plate 82. Each cam follower 115 has a shaft that is rigidly secured to the rear mounting plate 83, and extends from the rear surface of the rear mounting plate. The shaft is rotatably mounted to enable the cam follower 115 to rotate. The cam followers 115 are also spaced equidistantly around the opening 86 of the rear mounting plate 83 to define a center point 117 at about the center of the opening. Each cam follower 115 is spaced about 4½ inches from this center point 117 of the opening 86 in the plate 83. These two center points 116 and 117 define a central axis 120 of the rotation assembly 110. Although the rotation assembly 110 is shown and described as having four guide rollers 114 and three cam followers 115, it should be understood that three or more guide rollers of cam follower could be used without departing from the broad aspect of the invention.

The rotation assembly 110 includes a guide disc 131 and a support disc 141, as best shown in FIGS. 11, 11a, 12 and 12a. The guide disc 131 has a diameter of about nine inches, and has a V-shaped outer edge 132 that is snugly received between each of the guide rollers 114. The center of the guide disc 131 is located on the central axis 120 of the rotation assembly 110. The disc 131 has a central opening 136 and three offset slots 137. The central opening 136 has an oval shape due to the increased width of the spindle at this location. The support disc 141 has a diameter of about nine inches, and a flat outer edge 142 that is snugly received between each of the cam followers 115. The center of the support disc 141 is also located on the central axis 120 of the rotation assembly 110. The support disc 141 has a central opening 146 and three offset slots 147.

The hub 90 is snuggly and slidably received and held between the guide disc 131 and the support disc 141. Three hub bolts 149 join the hub 90 and discs 131 and 141. One bolt 149 extends through one of the three holes 97 in the hub 90, one of the offset slots 137 in the guide disc 131 and one of the offset slots 147 in the support disc 141. When joined together, the ends 92 and 93 of the hub 90 abut the inside surface of the guide disc 131 and support disc 141 respectively. The discs 131 and 141 are integrally connected with their centers aligned with the central axis 120. When the rotation assembly 110 is rotated about its central axis 120, both discs 131 and 141 rotate in unison about the central axis. The hub 90 also rotates in unison with the discs 131 and 141, but its center axis 100 is not necessarily aligned with the central axis 120, as discussed below.

Figure 9A:
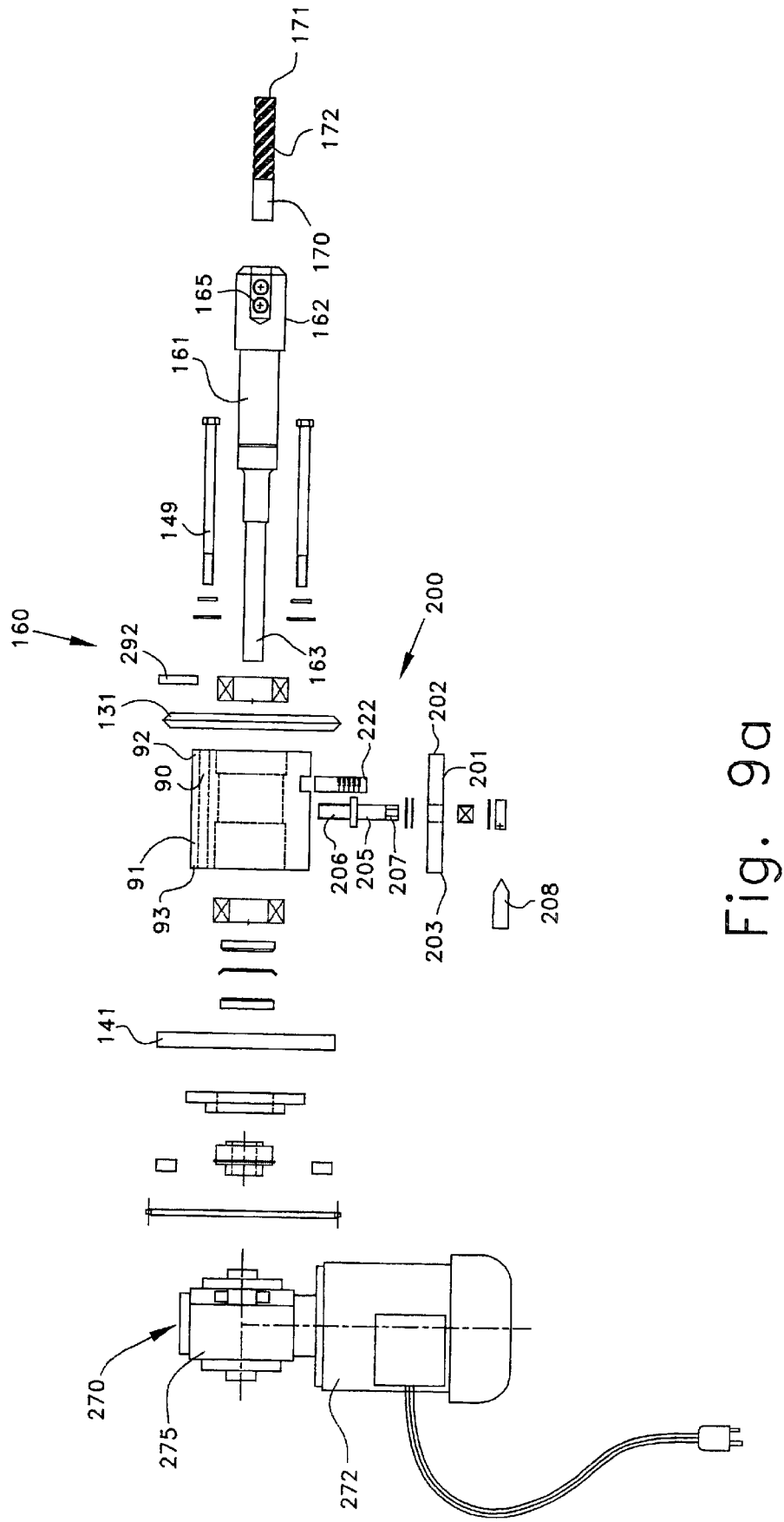
FIG. 9a is an enlarged, exploded view of the spindle assembly and spindle drive assembly.

The hub and spindle assembly 80 includes a spindle assembly 160, as best shown in FIG. 9a. The spindle assembly 160 includes a spindle 161 formed by a generally round shaft with front and rear ends 162 and 163. The diameter of the spindle is larger toward its front end 162 where a number of set screws 165 are located. A number of bearings are received by the spindle to rotatably secure it to the hub 90. A tool 170 is secured to the spindle via set screws 165 during use. The tool 170 is generally cylindrical in shape with a blunt end or tip 171 and a given diameter defined by its cutting surface 172. The hub 90 spindle 161 and tool 170 share a common center axis 180. This common axis 180 is in-line with the center axis 100 of the hub 90. While the center axis 100 of the hub 90 is in-line with this common axis 180, the hub does not rotate about this axis 180. The spindle 161 and tool 170 are in-line with this common axis 180 and are free to rotate about this common axis, as discussed below.

Figure 4:
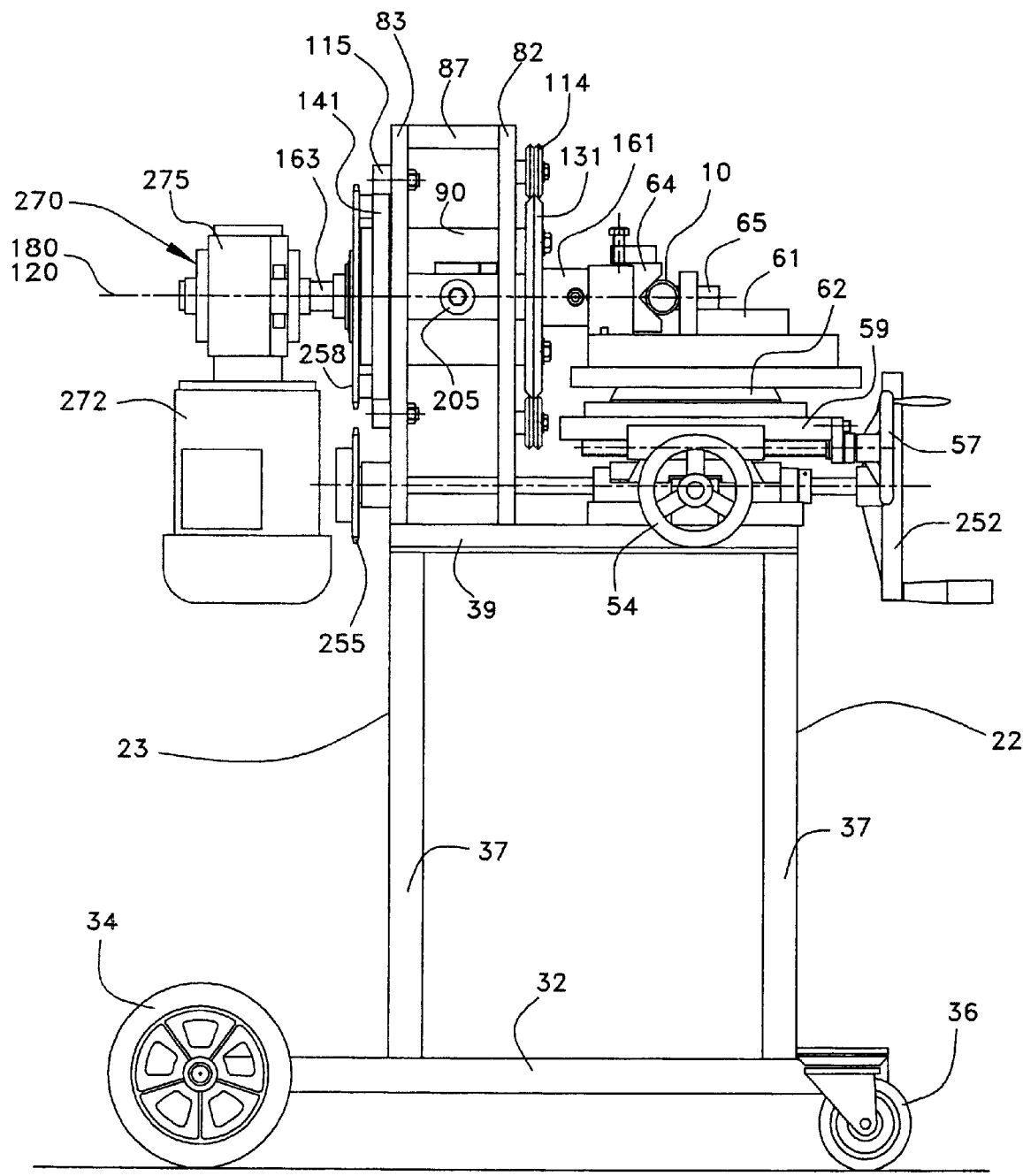
FIG. 4 is a side view of the notching machine showing the alignment of the positioning table, hub and spindle assembly, and spindle drive mechanism.
Figure 7:
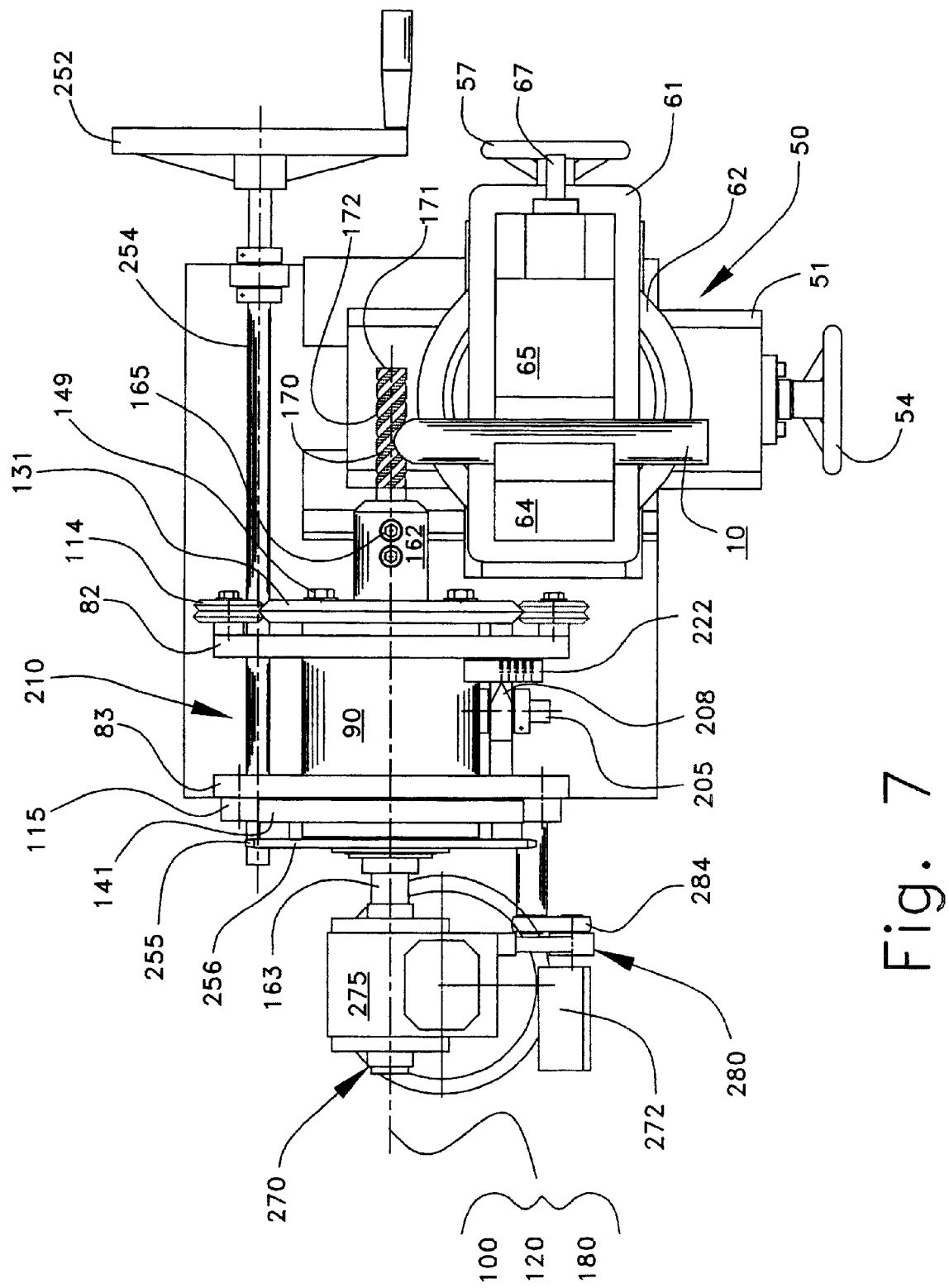
FIG. 7 is a top plan view of the notching machine showing the alignment of the positioning table, hub and spindle assembly, and spindle drive mechanism.

The hub and spindle assembly 80 further includes an offset mechanism 200, as best shown in FIGS. 4, 7 and 9a. The offset mechanism 200 includes a tie block 201 with front and rear ends 202 and 203, and an offset screw 205 with an inner end 206, an outer end 207 and an intermediate marker 208. The front end 202 of the tie block 201 is bolted or otherwise rigidly secured to the guide disc 131. The rear end 203 is bolted or otherwise rigidly secured to the support disc 141. The tie block 201 is secured to the discs 131 and 141 at a location slightly further out than the outside surface 94 of the hub 90 when the hub is in a home position center of the hub 180 is in line with the central axis 120 of the rotation assembly 110. The tie block 201 includes an opening that receives the offset screw 205. On each side of this opening is a thrust bearing. The shaft of the offset screw 205 has a raised portion that is axially captured between these thrust bearings. The inner end 206 of the offset screw 205 is threaded to threadably engage the threaded opening 102 in the outer surface 94 of the hub 90. The outer end 207 extends through the opening in the tie block 201. The outer end 207 is adapted to receive a hex shaped socket or other tool for turning the offset screw 205 to advance it toward or away from the hub 90.

Figure 5:
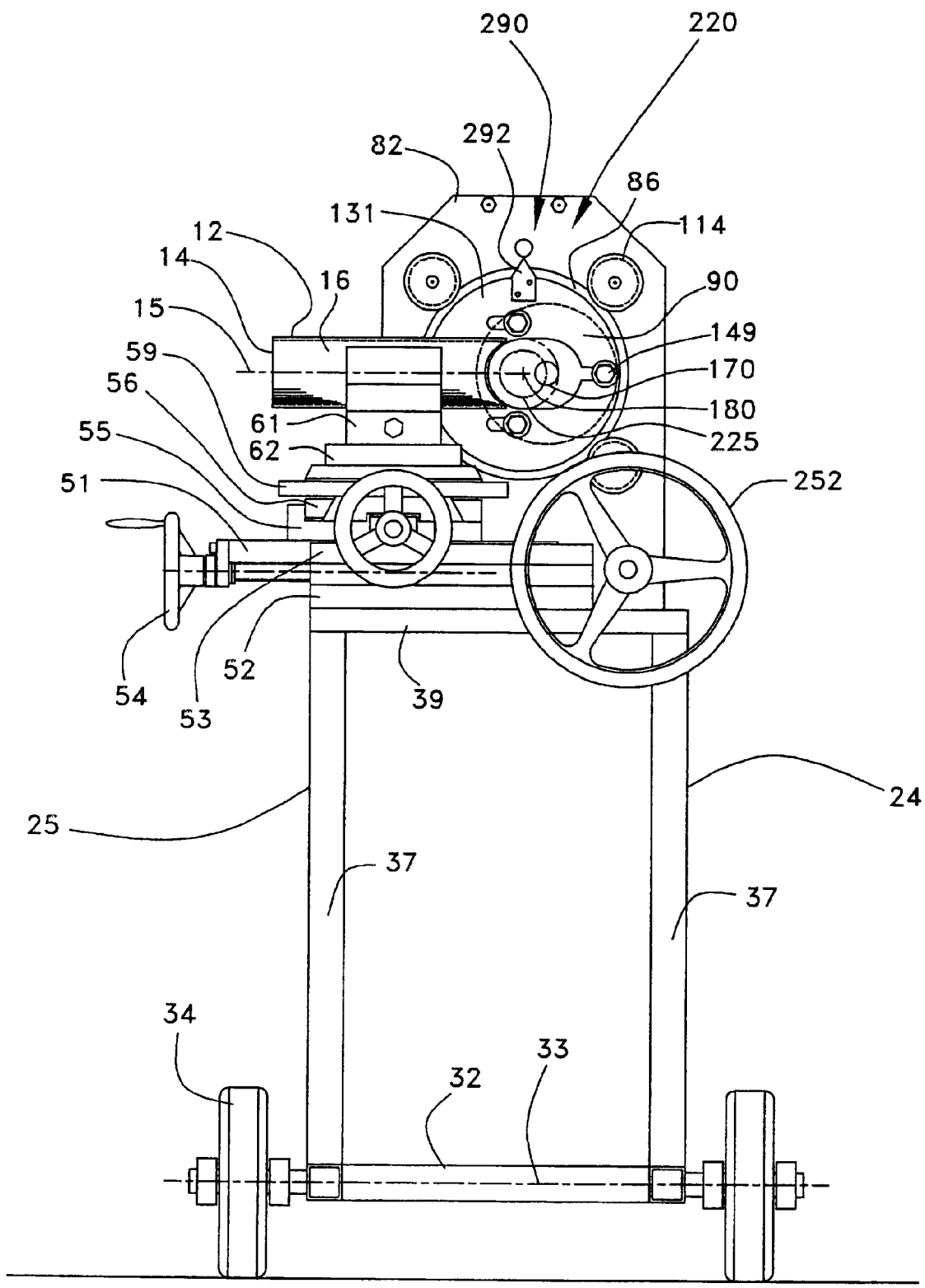
FIG. 5 is a front view of the notching machine showing the longitudinal axis of the tube in horizontal and planar alignment with the central axis of the rotation assembly, the common axis of the spindle being offset from the central axis of the rotation assembly, and the orbit path of the tool traveling around the central axis of the rotation assembly.
Figure 6:
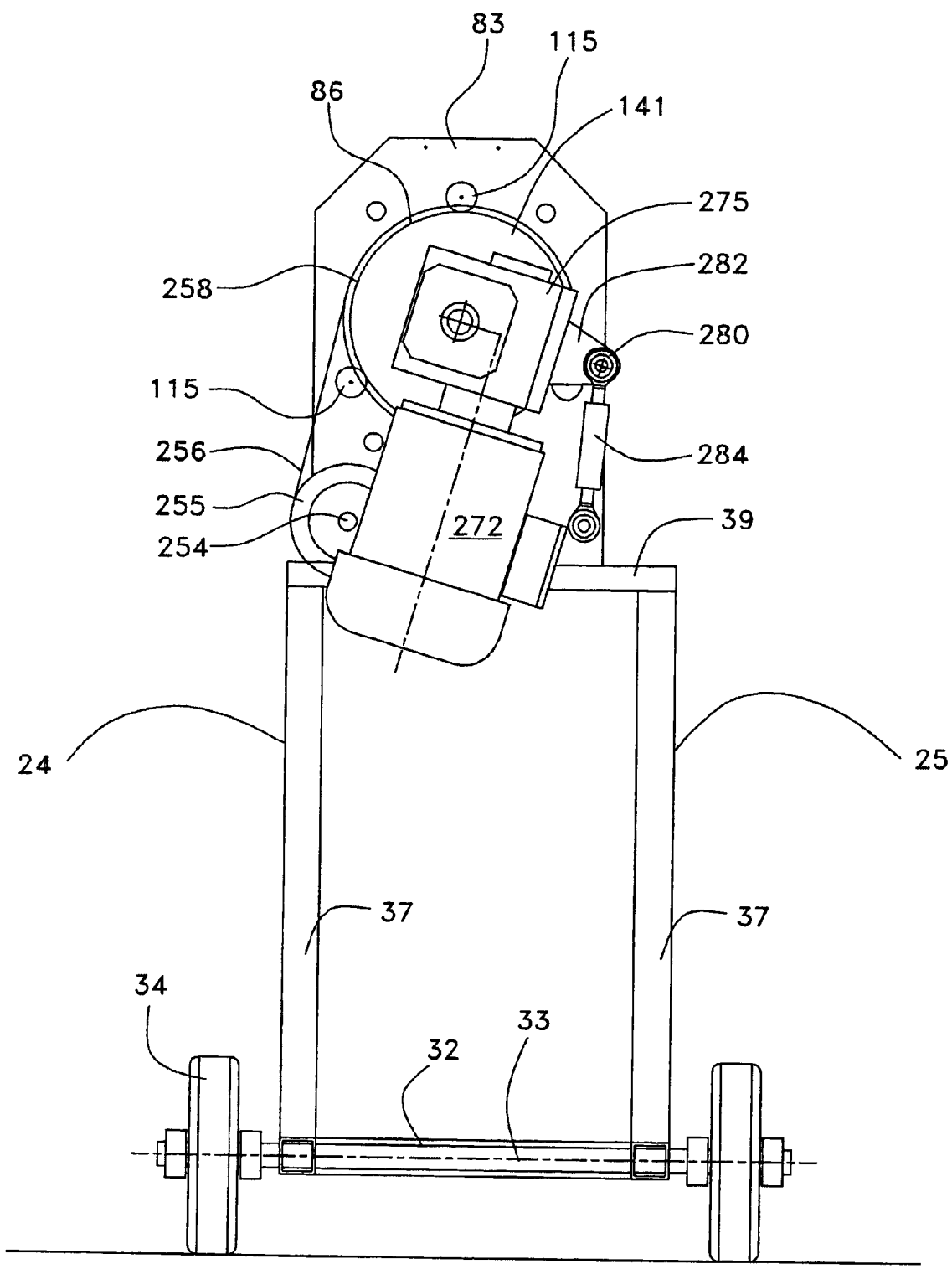
FIG. 6 is a rear view of the notching machine showing the spindle drive motor, gear reducer and torsion bar, and the hub drive chain.
Figure 8:
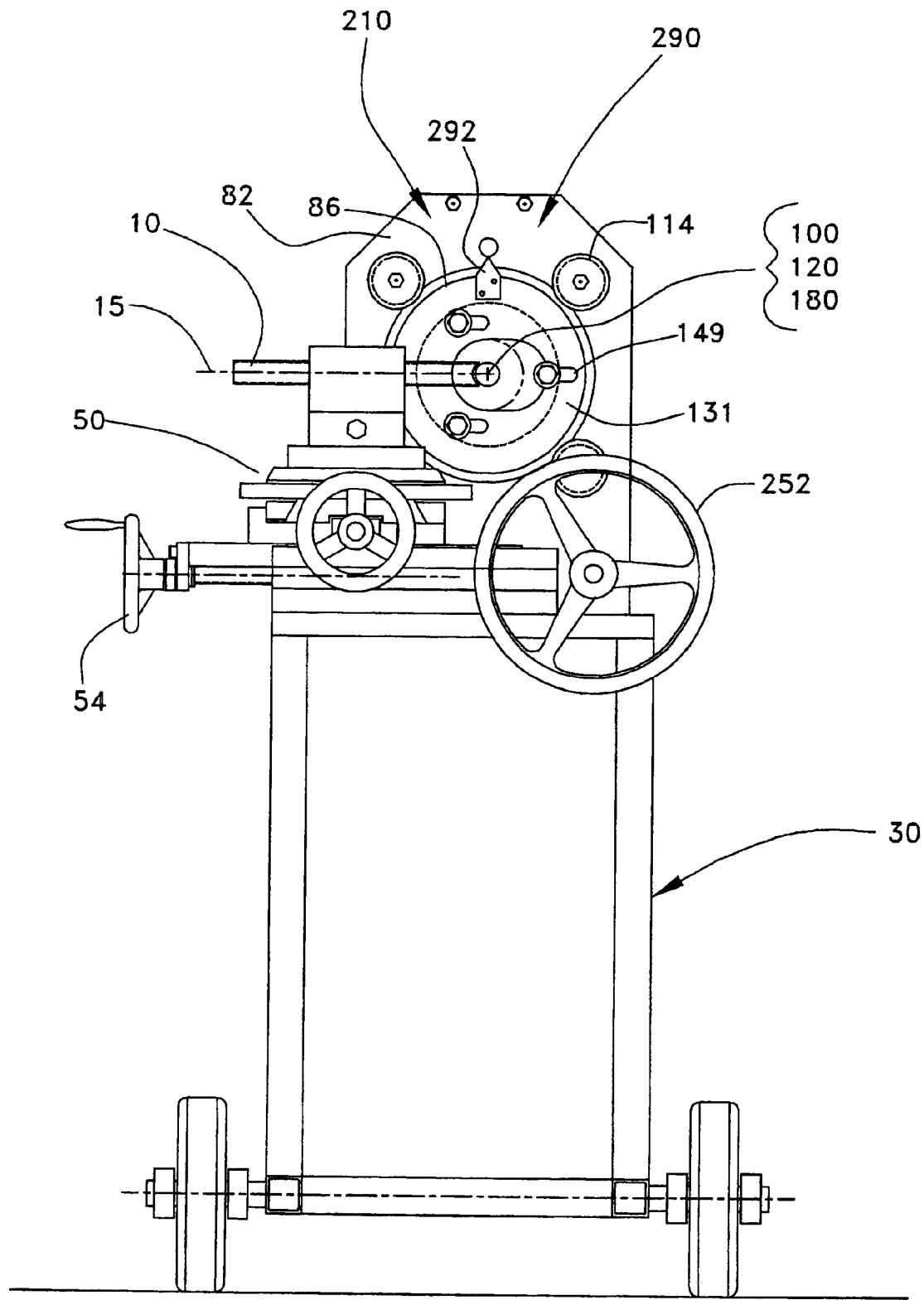
FIG. 8 is a front view of the notching machine showing the common axis of the hub and spindle in linear alignment with the central axis of the rotation assembly, and the orbit path of the spindle traveling around the axis of the hub.

The hub 90 and spindle 161 are in a home position 210 when their common axis 180 is in-line with the central axis 120 of the rotation assembly 110, as shown in FIG. 8. When in this home position 210, the bolts 149 of the rotation assembly 110 are to the far left of the slots 137 and 147 of discs 131 and 141. The offset mechanism 200 is used to move the hub 90 and spindle 161 out of the home position 210 and into an offset position 220 as shown in FIG. 5. When the offset screw 205 is rotated in one direction so that its inner end 206 moves in a direction of the hub 90, the offset screw pushes or otherwise moves the hub and spindle into this offset position 220. When the offset screw 205 is rotated in the opposite direction so that its inner end 206 moves in a direction away from the hub 90, the offset screw pulls or otherwise moves the hub and spindle back toward its home position 210. The offset screw 205 is rotated to selectively adjust the distance the hub 90 and spindle 161 are moved away from the home position 210. The marker 208 is fixed to the tie bar 87 of the mounting plates 82 and 83 and can be compared to a scale 222 that travels with the hub 90 to set the desired amount of offset. When the offset screw 205 is fully extended to its maximum offset distance, the bolts 149 of the rotation assembly 110 are to the far right of the slots 137 and 147 of discs 131 and 141.

When the hub 90 and spindle 161 are in the offset position 220, the common axis 180 of the hub, spindle and tool 170 is parallel to but offset from the central axis 120 of the rotation assembly 110. Thus, when the rotation assembly 110 and guide and support discs 131 and 141 are rotated about their central axis 120, the common axis 180 orbits about the central axis along a substantially circular path of travel 225. The hub 90, spindle 161 and tool 170 also orbit or otherwise move about the central axis 120 along this path of travel 225.

A hub drive mechanism 250 is used to rotate hub 90 via the rotation assembly 110. As best shown in FIGS. 4, 6, 7 and 9, the hub drive mechanism 250 includes a hand wheel 252 located at the front 22 of the notching machine 20 and drive shaft 254 connected to the hand wheel and extending to the rear 23 of the machine. The drive shaft is rotatably mounted to the base plate 39 and mounting plates 82 and 83. The rear end of the drive shaft 254 has a sprocket 255 that engages a continuous loop chain 256. The chain 256 engages a sprocket 258 secured to the support disc 141. Turning or rotating the hand wheel 252 in a counter-clockwise direction will rotate the rotation assembly 110, discs 131 and 141. The rotation of the guide and support discs 131 and 141 rotates the hub 90 and spindle 161 about the central axis 120 of the rotation assembly 110. A one-way clutch mechanism (not shown) is provided so that the hand wheel 252 can only rotate in a counterclockwise direction.

A spindle drive mechanism 270 is used to rotate the spindle 161 and tool 170 about their common axis of rotation 180. As best shown in FIGS. 4, 6, 7 and 9a, the spindle drive assembly 270 includes an electric motor 272 that is linked via a gear reducer 275 to the spindle 161. The output shaft or tube of the gear reducer 275 is rigidly secured to the rear end 163 of the spindle 161. When the spindle motor 272 is activated the output shaft of the gear reducer 275 drives and rotates the spindle at a relatively high rate of speed. The motor 272 preferably a standard electric motor operating on 15 amps and 110 volt. The spindle motor 272 and gear reducer 275 are supported by the spindle 161, and thus move in the same orbiting path of travel 225 as the spindle. An anti-torque device 280 is used to stabilize the motor 272 and maintain it in a substantially fixed position. The anti-torque device 280 includes a triangular shaped spacer plate 282 and a torque rod 284. One end of the spacer plate 282 is rigidly bolted or otherwise fixed to the motor 272 and gear reducer 275. The other end of the spacer bar extends to the side 25 of the machine 20. This other end is pivotally joined to one end of the torque rod 284. The other end of the torque rod 284 is pivotally secured to the mounting plate 83. The anti-torque device 280 allows the gear reducer 275 to move through the orbiting path of travel 225 of the spindle 161, but does not allow the motor 272 to rotate about the common axis 180 of rotation of the spindle.

Operation of the Notching Machine

Figure 13A:
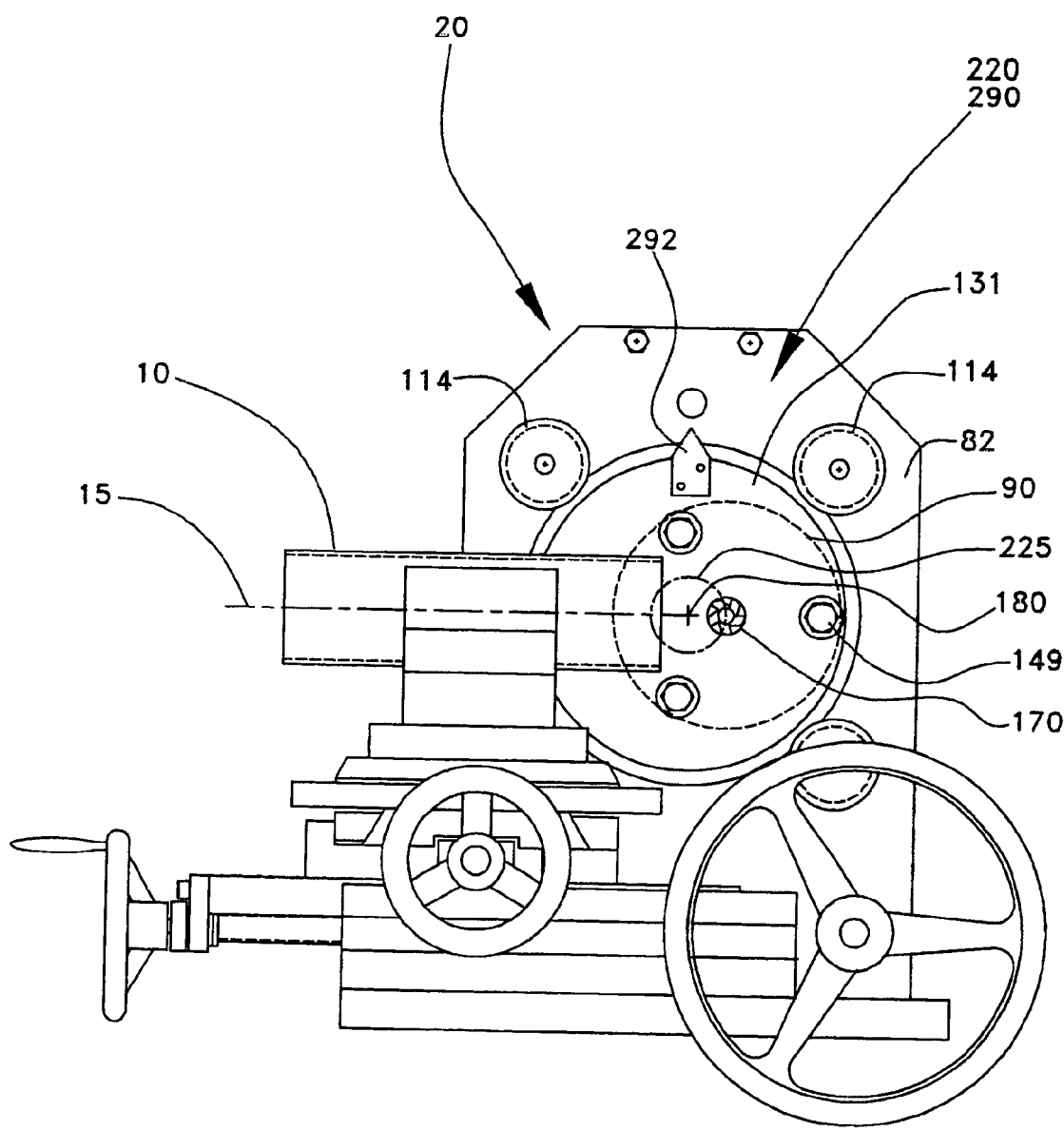
FIG. 13a is a front view showing a tube aligned and fixed in a desired position prior to forming a notch, the axis of the tube being in planar alignment with the axis of the hub rotation assembly, the spindle and hub being offset from the hub rotation assembly, and the hub, spindle and tool in a home position.
Figure 13B:
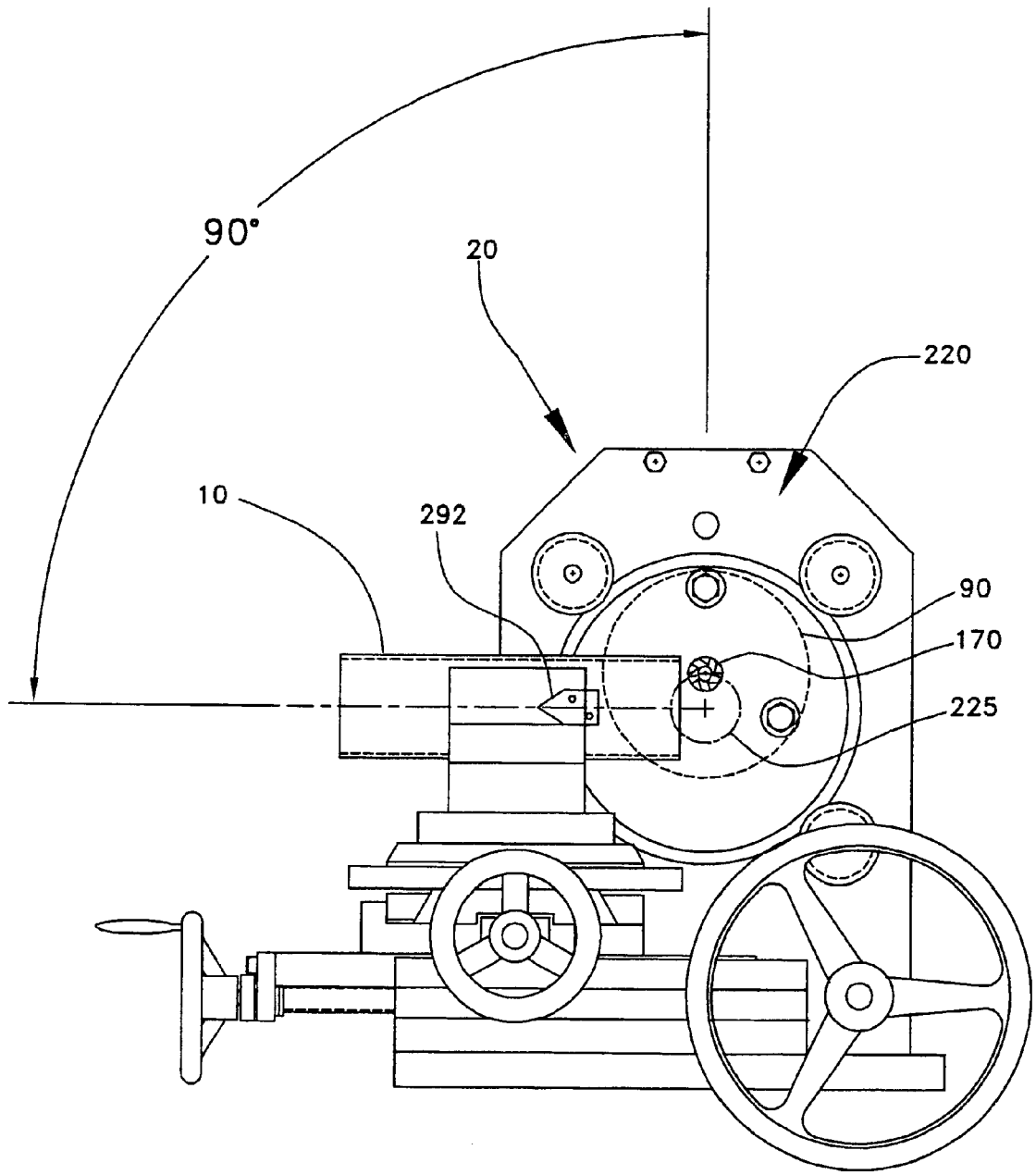
FIG. 13b is a front view showing the hub, spindle and tool advanced 90° from their home position.
Figure 13C:
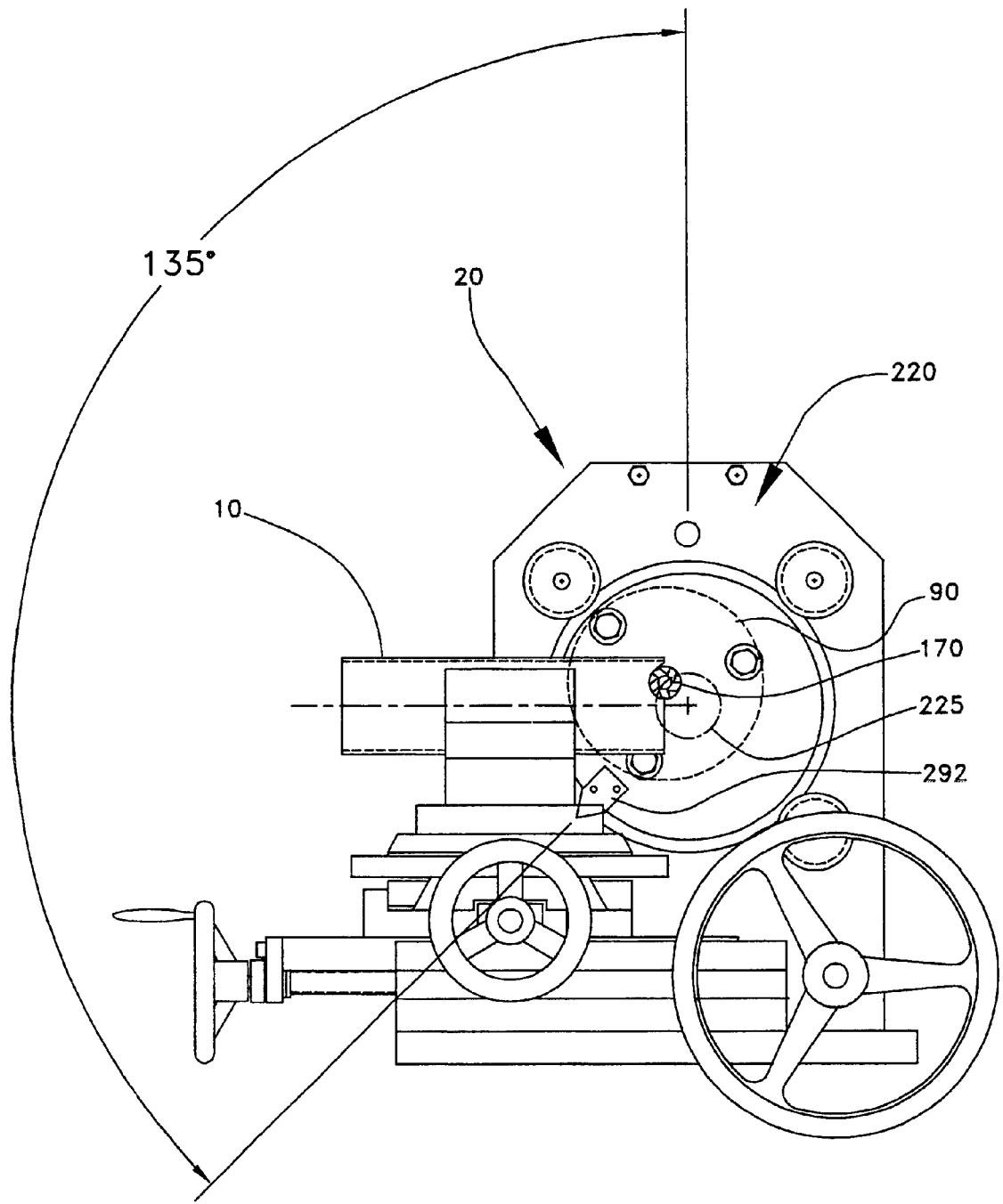
FIG. 13c is a front view showing the hub, spindle and tool advanced 135° from their home position, with the tool beginning to form the notch in the end of the tube.
Figure 13D:
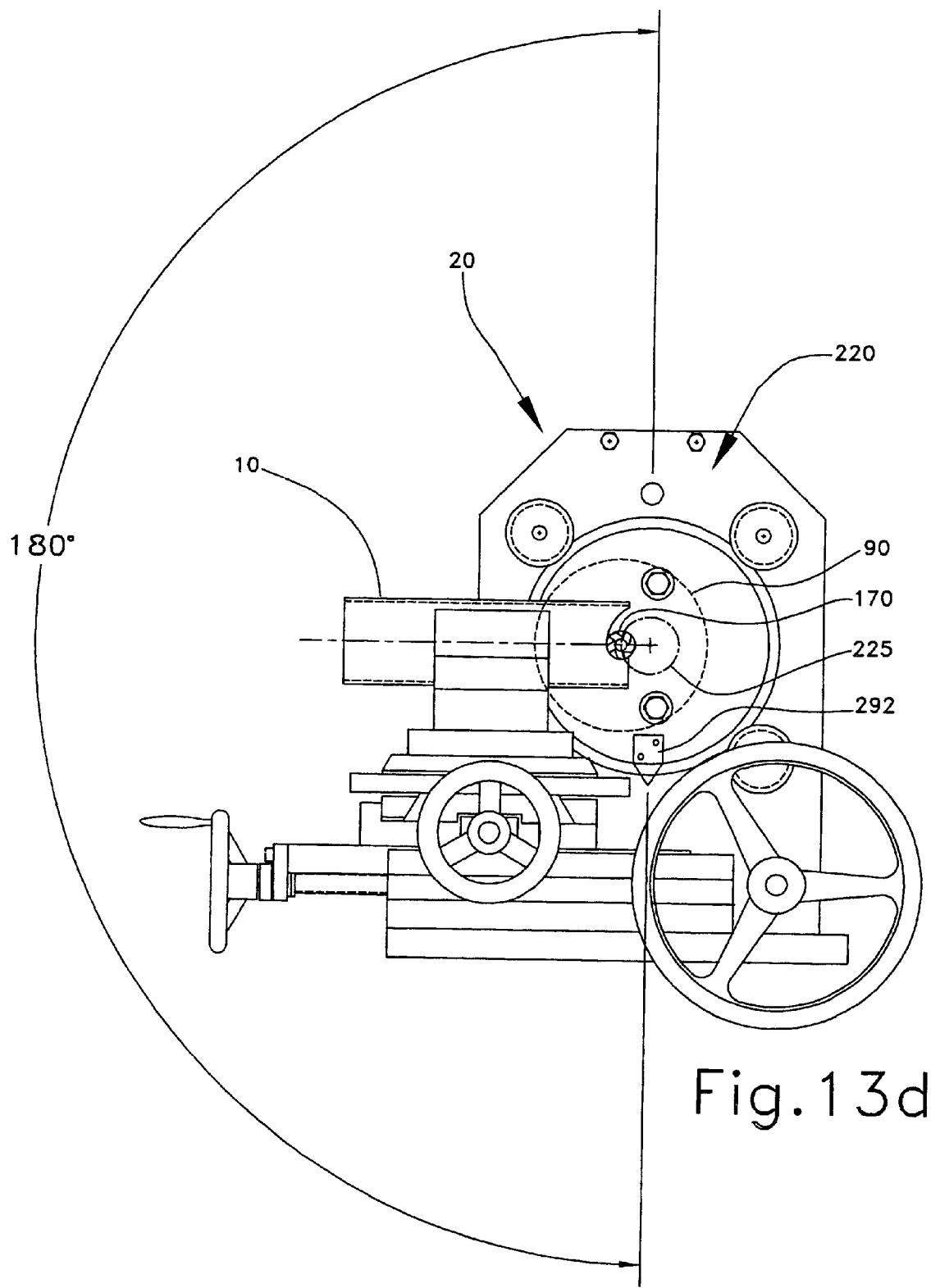
FIG. 13d is a front view showing the hub, spindle and tool advanced 180° from their home position, with the tool continuing to form the notch.
Figure 13E:
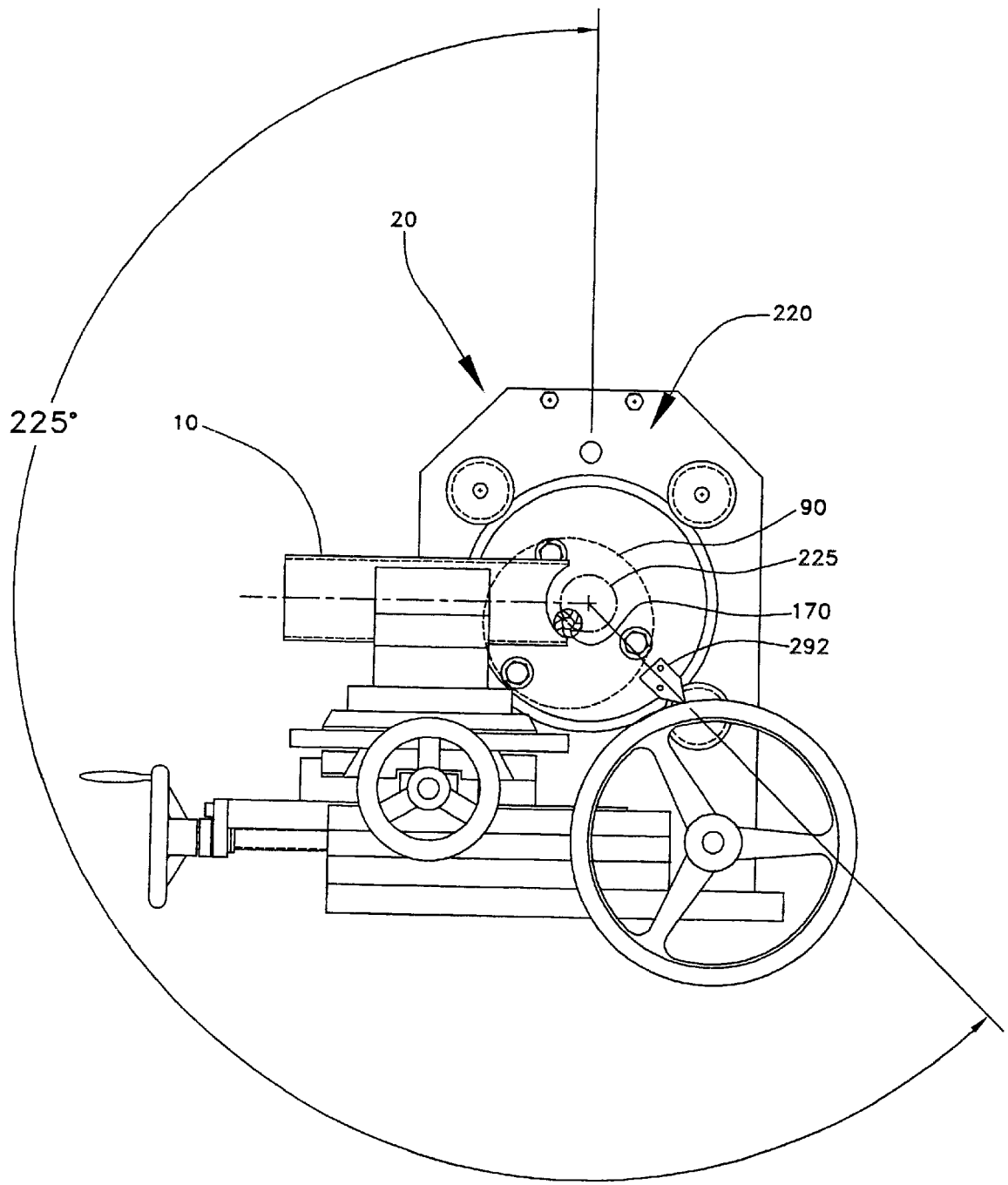
FIG. 13e is a front view showing the hub, spindle and tool advanced 225° from their home position, with the notch just about complete.
Figure 13F:
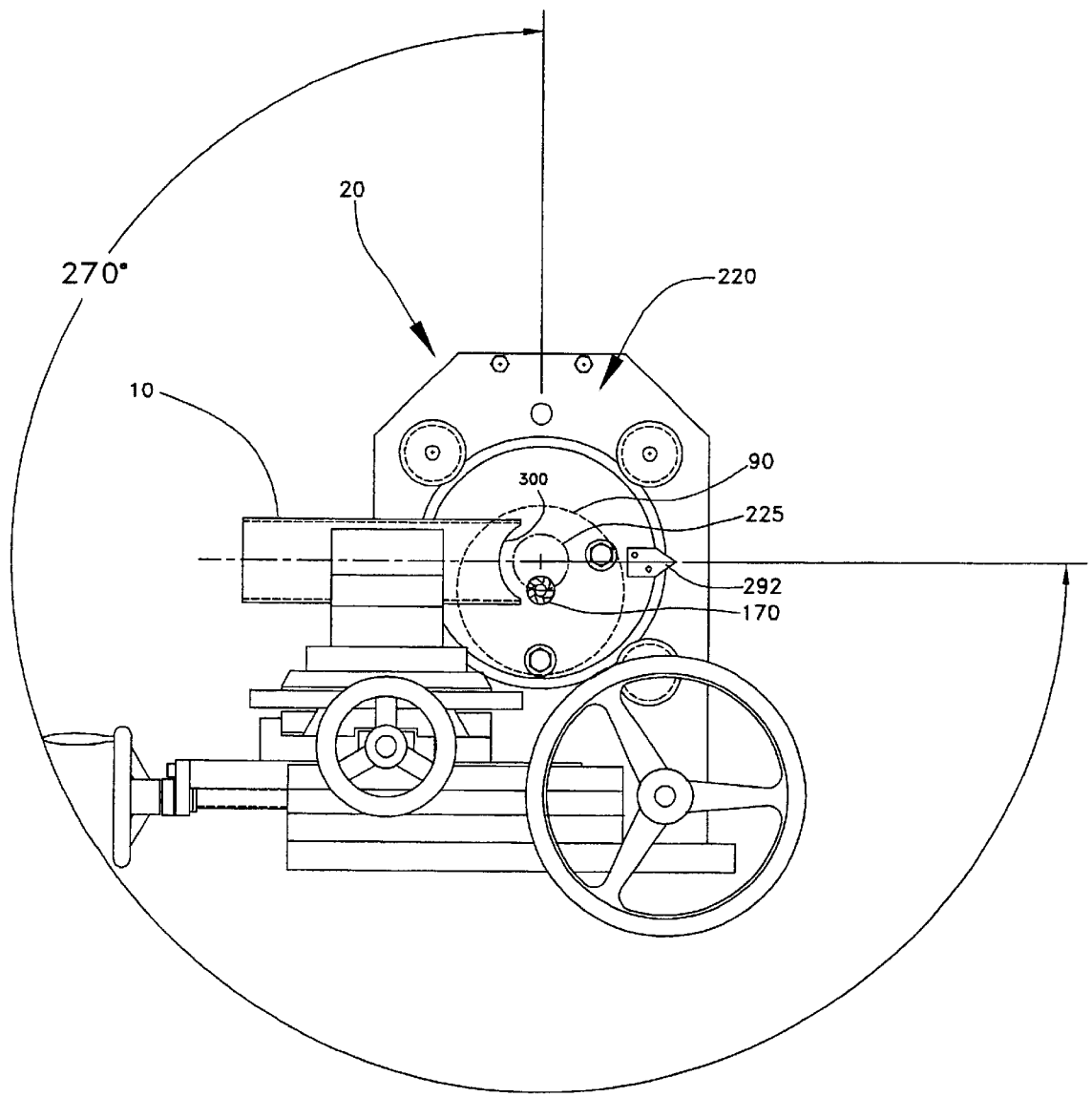
FIG. 13f is a front view showing the hub, spindle and tool advanced 270° from their home position, with the notch complete.
Figure 14A:
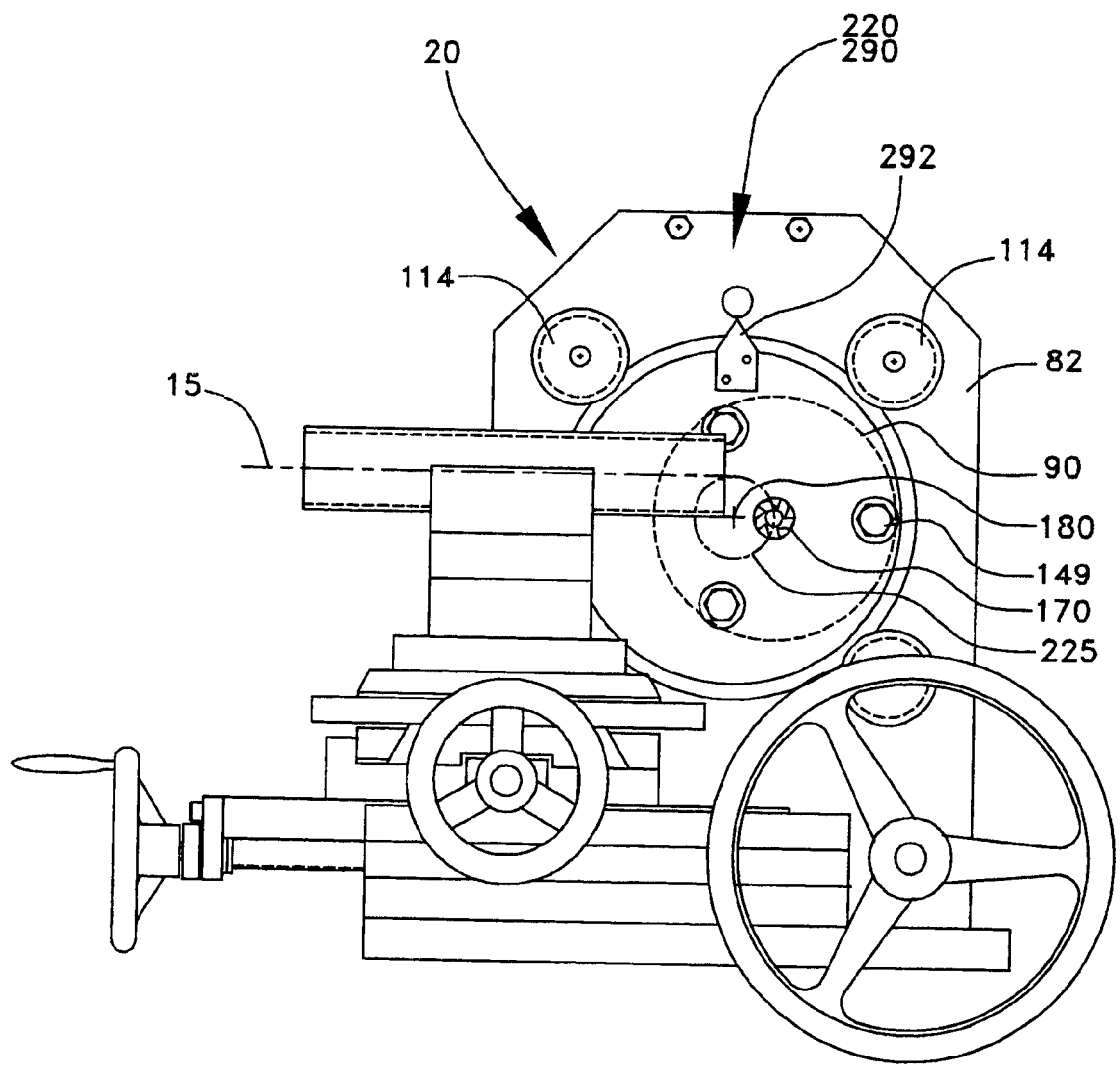
FIG. 14a is a front view showing a tube aligned and fixed in a desired position prior to forming a notch, the axis of the tube being offset from the axis of the hub rotation assembly, and the hub, spindle and tool in a home position.
Figure 14B:
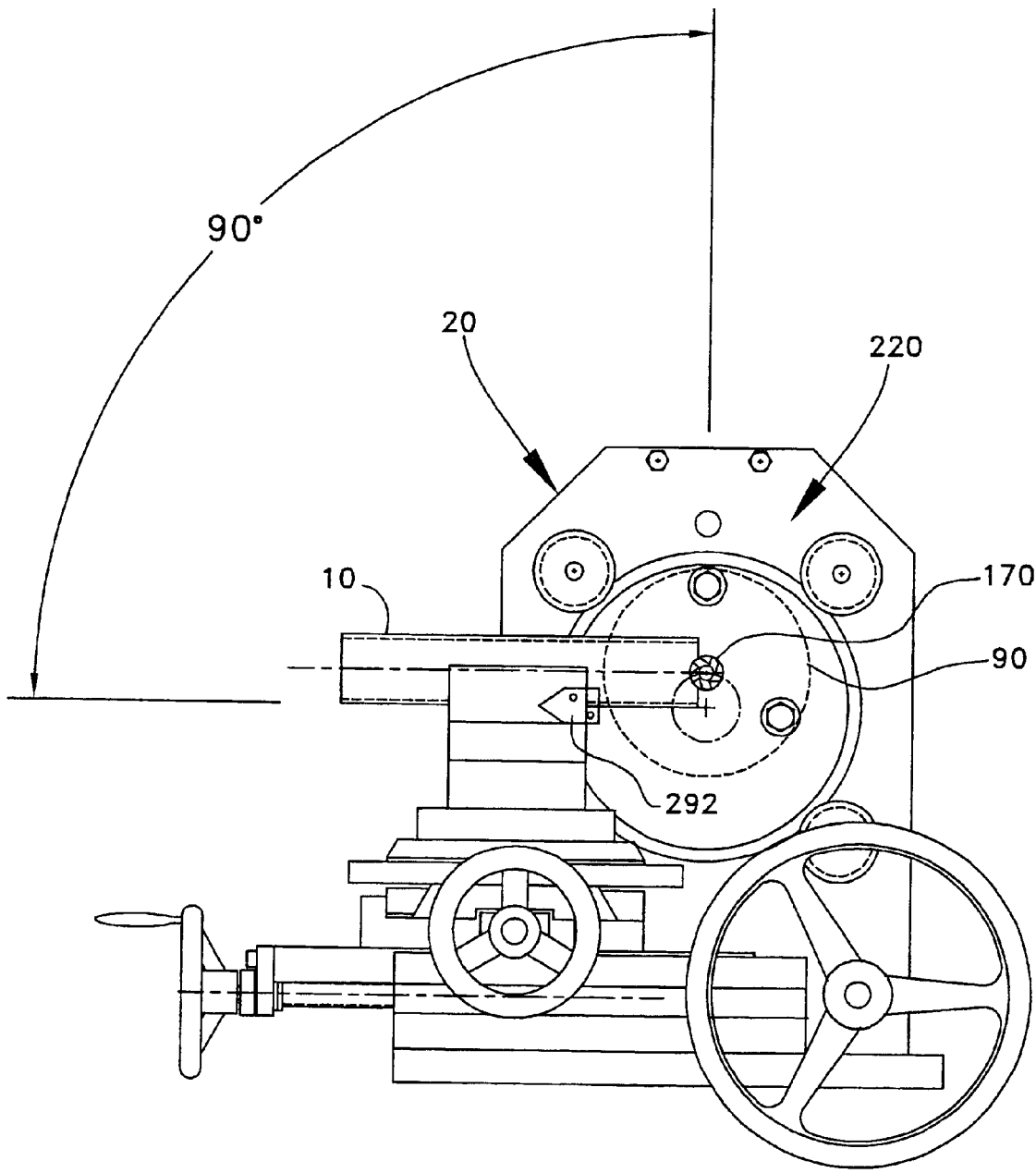
FIG. 14b is a front view showing the hub, spindle and tool advanced 90° from their home position, with the tool beginning to form an offset notch in the end of the tube.
Figure 14C:
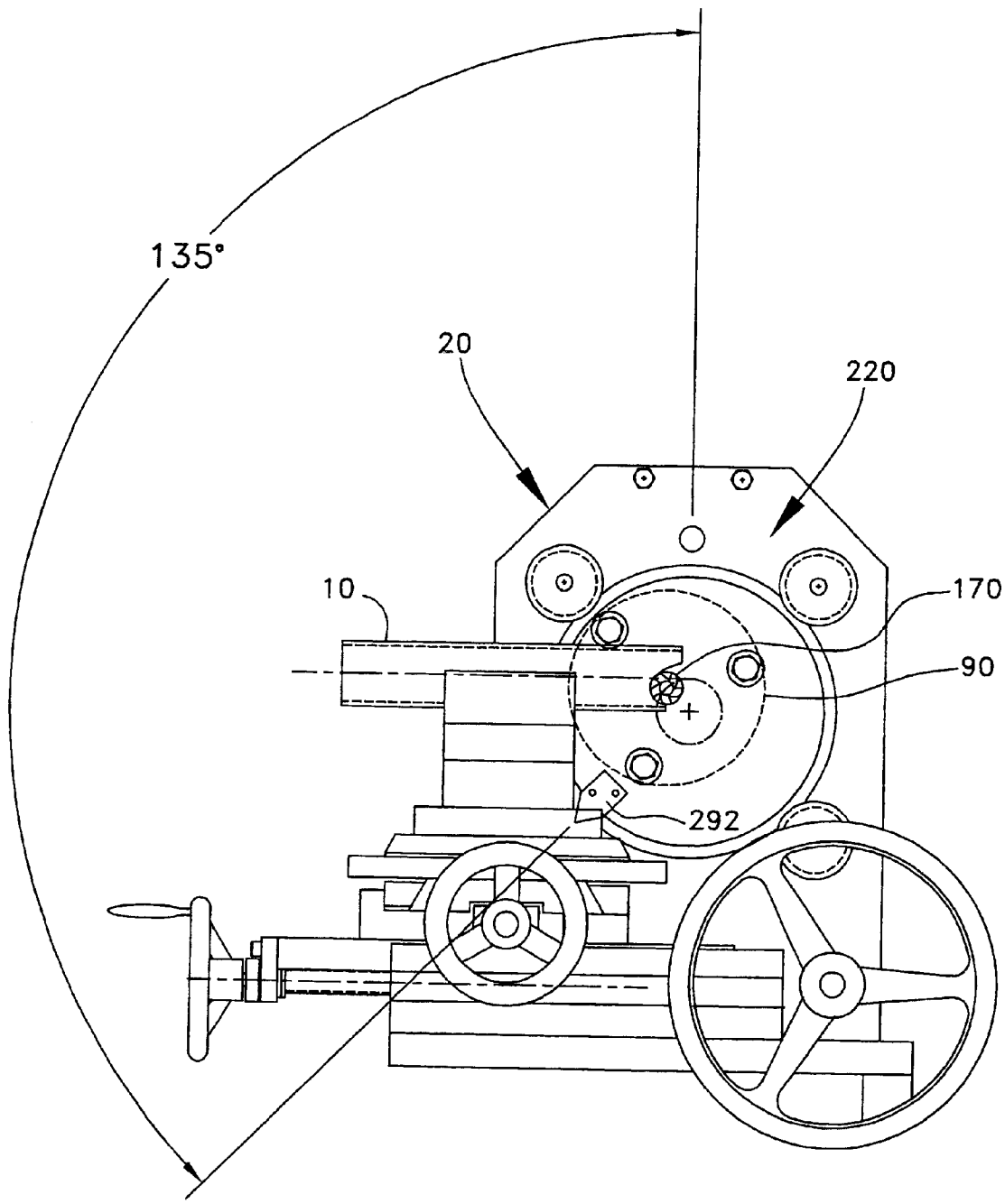
FIG. 14c is a front view showing the hub, spindle and tool advanced 135° from their home position, with the tool continuing to form the offset notch in the end of the tube.
Figure 14D:
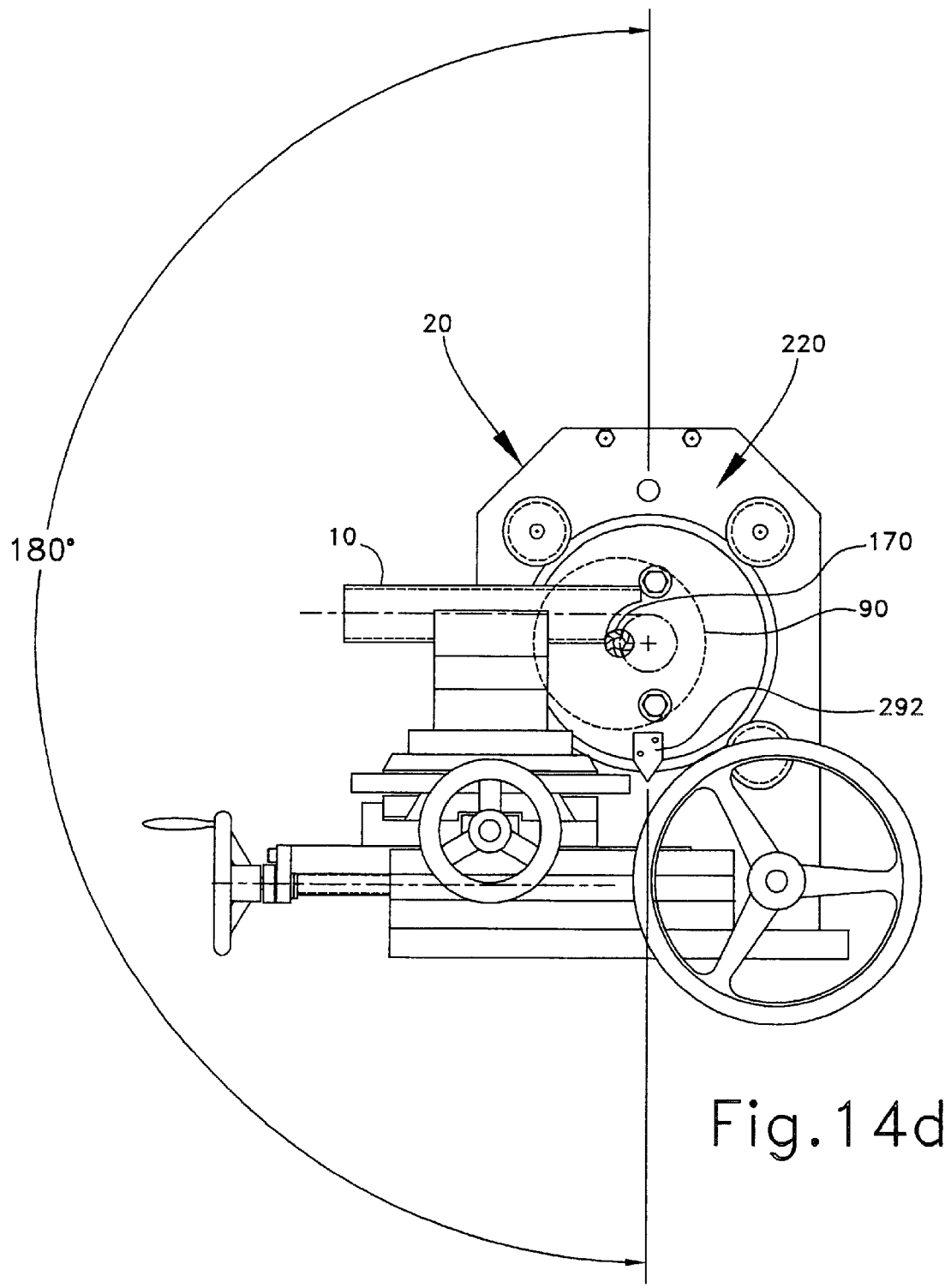
FIG. 14d is a front view showing the hub, spindle and tool advanced 180° from their home position, with the offset notch just about complete.
Figure 14E:
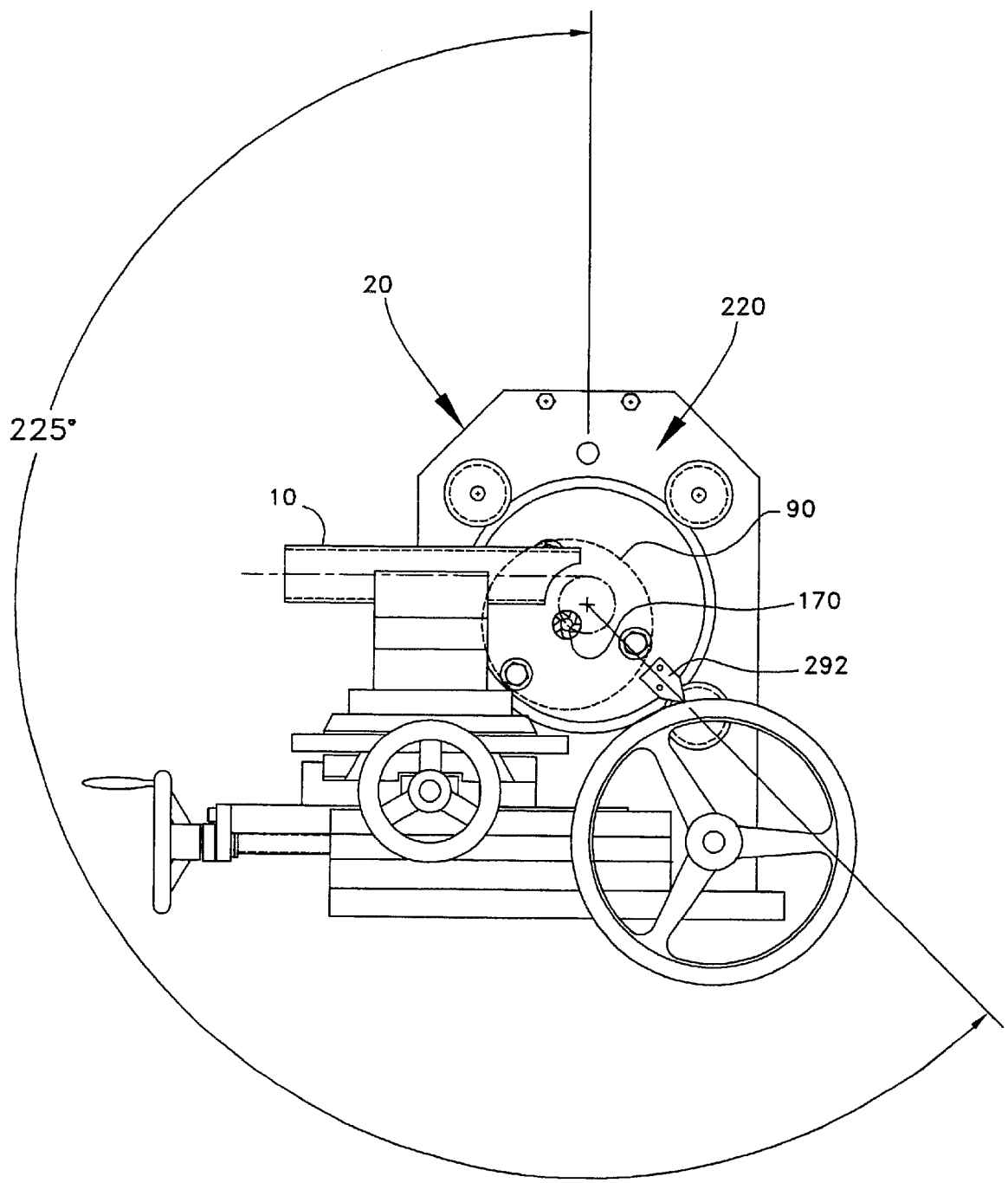
FIG. 14e is a front view showing the hub, spindle and tool advanced 225° from their home position, with the notch complete.
Figure 14F:
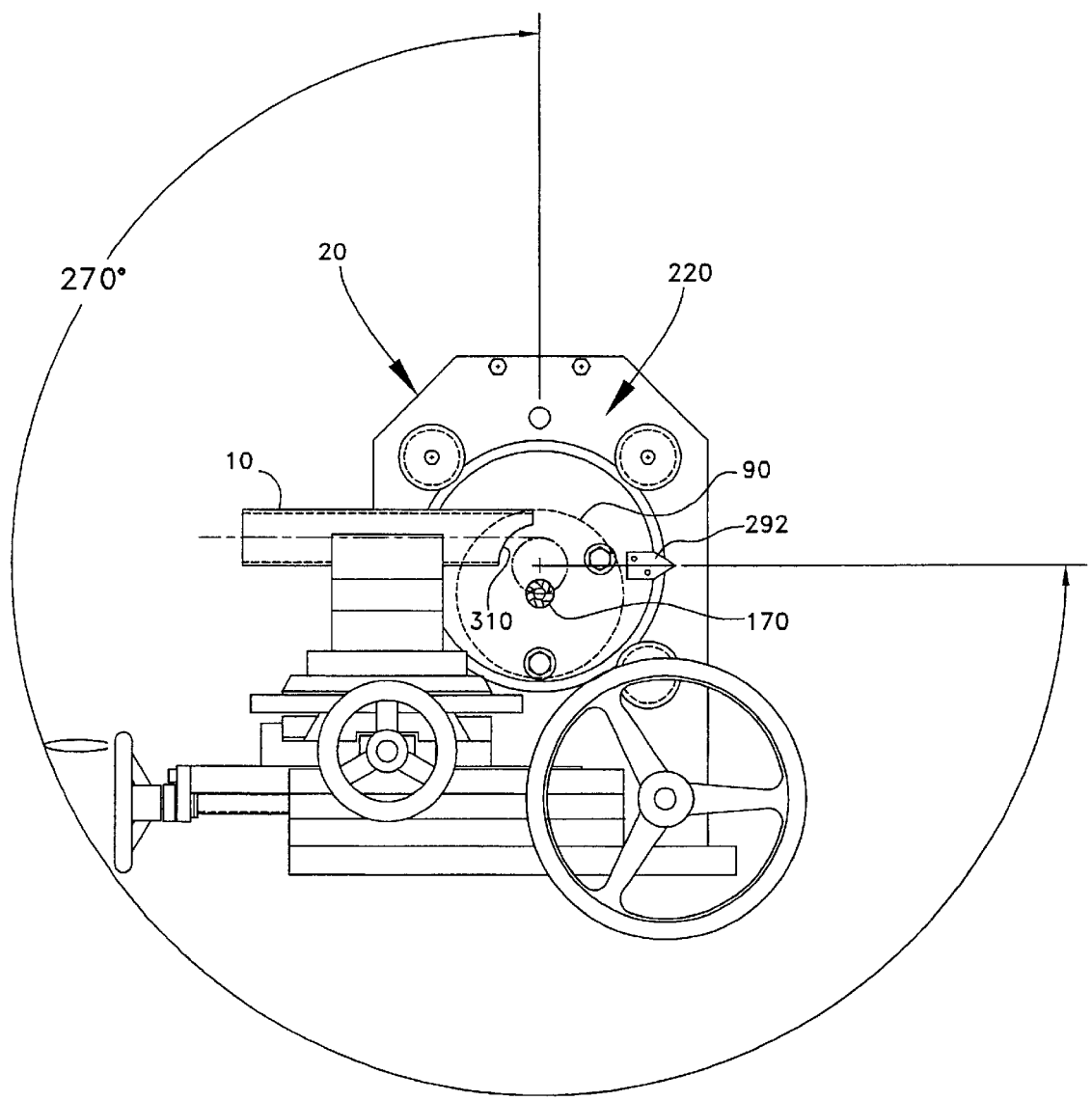
FIG. 14f is a front view showing the hub, spindle and tool advanced 270° from their home position.

Although the above description should render the operation of the variable radius notching machine 20 apparent, the following is provided to assist the reader. Before a notch is formed in the end of the tube 10, the hub rotation assembly 110 and guide disc 131 are brought to a home position 290 with a marker 292 pointing up as shown in FIG. 13a. When the rotation assembly 110 is at its home position 290, the tool 170 is at its furthest location to the right side 24 of the machine 20. This ensures that the tool 170 is moved out of the way so that the tube 10 can be properly secured and aligned near the tool. The offset screw 205 should also be adjusted to select the desired amount of offset to form the desired radius of notch. When a one inch diameter tool 170 is secured by the set screws 165 of the spindle 161 and a ½ inch radius notch is desired, the offset screw 205 should be moved to its home position 210 where the marker 208 points at the one-inch diameter line on scale 222 as in FIG. 7. In this home position 210, the center line 180 of the tool 170 is in-line with the central axis of rotation 180 of the rotation assembly 110, so that the tool will not orbit about the central axis. If that same one inch diameter tool 170 is being used to cut a 1½ inch radius notch, the offset screw should be moved so that marker 208 points at the three-inch line on the scale 222 as would occur in FIGS. 13a and 14a.

The desired tube 10 is clamped between the jaws 64 and 65 of the vice 61. The cross slide table 51 and rotation assembly 62 of the vice 61 are then used to align an end 14 of the tube 10 next to the tool 170. The distance the end 14 of the tube 10 is from the tool 170 will depend on the amount of offset. When no offset is being used, the cross slide table 51 is used to advance the tool along a desired path of travel 295 toward the tool 170. When the maximum amount of offset is used, the cross slide table may not need to move at all because the orbiting path of travel 225 of the tool will be sufficient to fully engage the end 14 of the tube 10.

The notching machine 20 is capable of forming both a normal or full length notch 301 into the end of a tube as in FIGS. 13a–13f, or a partial of offset notch 302 as in FIGS. 14a–14f. When a normal notch is desired, the centerline 15 of the tube 10 is aligned on the same horizontal plane as the to the central axis 120 of the rotation assembly 110. This is also even with the common axis 180 of the spindle 161 and tool 170 when the tool is at its home position 290. When an offset notch is desired, the centerline 15 of the tube 10 should be elevated above the horizontal plane of the central axis 120. The spindle motor 272 is then activated to rotate spindle 161 and tool 170 counterclockwise about their common axis of rotation 180. The hand wheel 252 is then rotated counterclockwise to rotate the rotation assembly 110 in a counter clockwise direction. This rotation of the hub and spindle assembly causes the tool 170 to orbit in a circular path of travel 225 as shown in FIGS. 13a–13f and FIGS. 14a–14f. Once the notch has been formed, the tube is removed from the vice and is ready for assembling into a complete fixture, piping system or consumer product.

Figure 15:
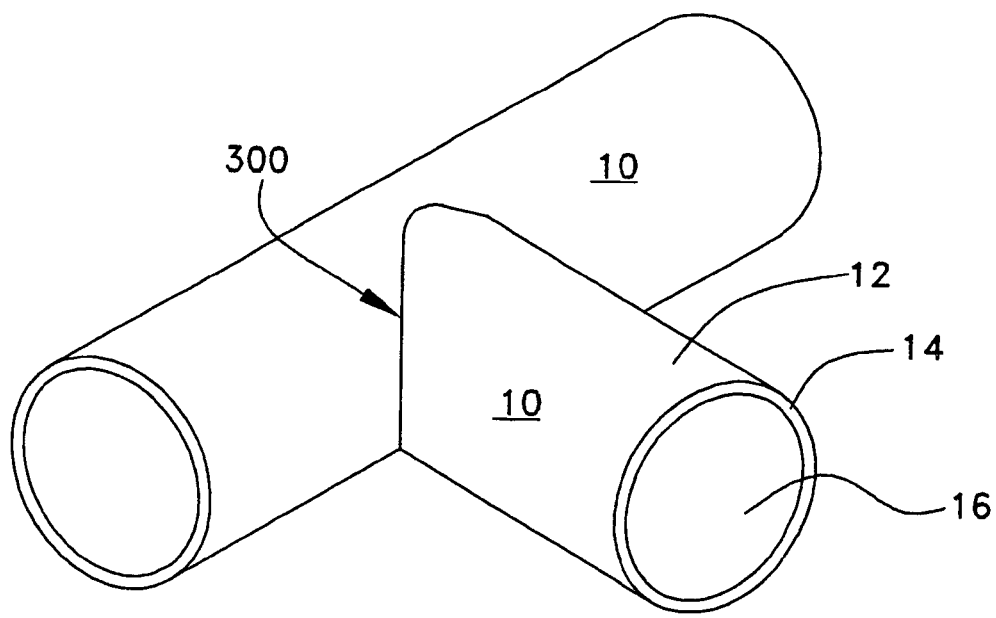
FIG. 15 is a perspective view of a normal tube joint formed by two equal diameter tubes, one tube having a notch formed in its end to flushly mate with the sidewall of the other tube, the longitudinal axis of the tube falling in the same plane.
Figure 15A:
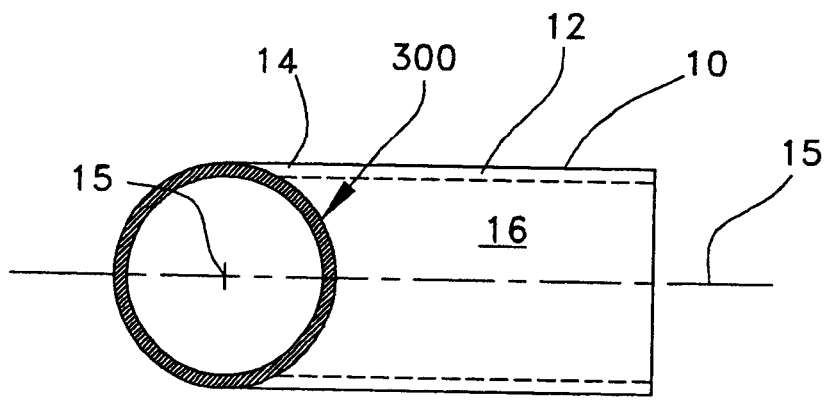
FIG. 15a is a cross-sectional view of the normal tube joint showing the roughly semi-circular shape of the notch when seen from this view.
Figure 16:
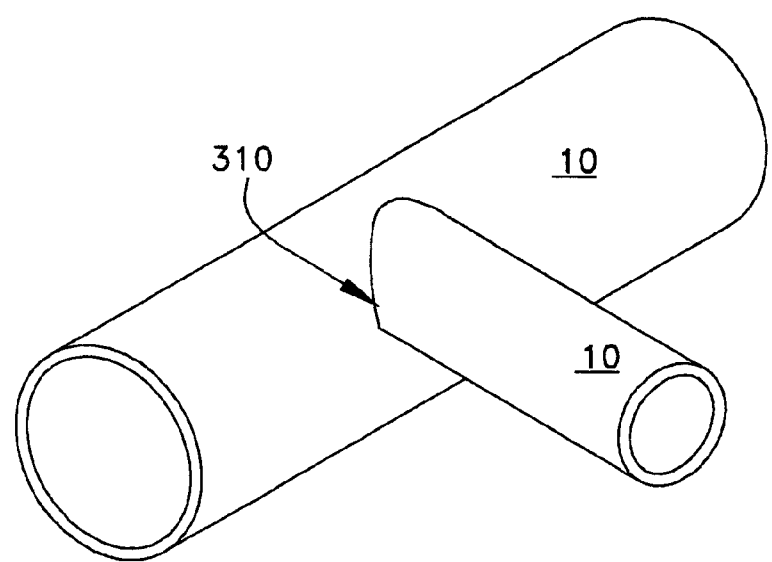
FIG. 16 is a perspective view of an offset tube joint formed by one larger diameter tube and a smaller tube having a notch formed in its end to flushly mate with the sidewall of the larger tube, the longitudinal axis of each tube being offset from the other.
Figure 16A:
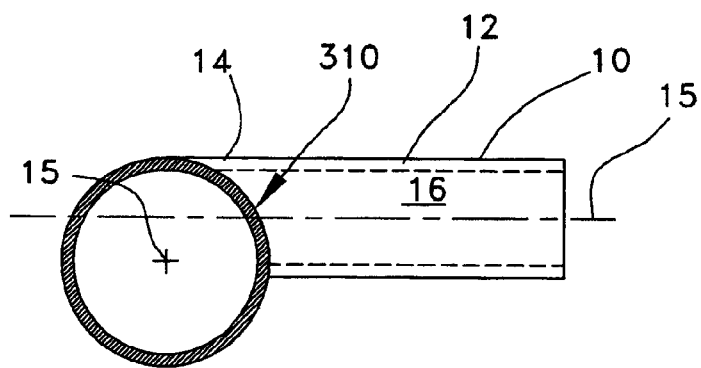
FIG. 16a is a cross-sectional view of the offset joint showing the partial, semi-circular shape of the offset notch when seen from this view.

The notching machine is capable of creating various notch geometries. FIG. 15 and 15a show an end 14 of one tube 10 having a normal or full length notch 300 flushly engaging the sidewall 12 of another tube. FIGS. 16 and 16a show an end 14 of a tube 10 having an offset notch flushly engaging the sidewall 12 of another tube.

Figure 17:
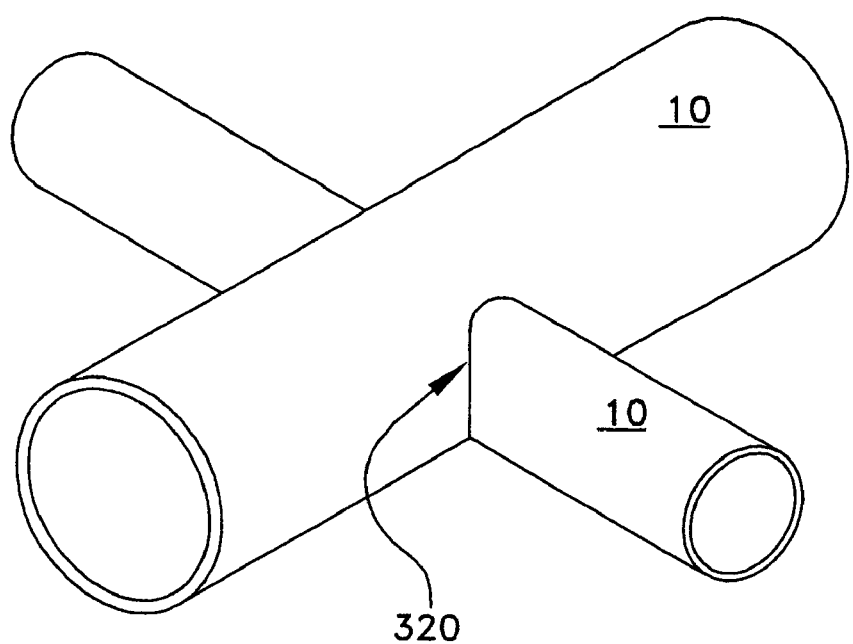
FIG. 17 is a perspective view of a plunge cut joint formed by a larger diameter tube having two axially aligned openings of a given diameter cut through opposed sides of its sidewall, and a smaller diameter tube flushly mating with and extending through the openings in the larger tube.
Figure 17A:
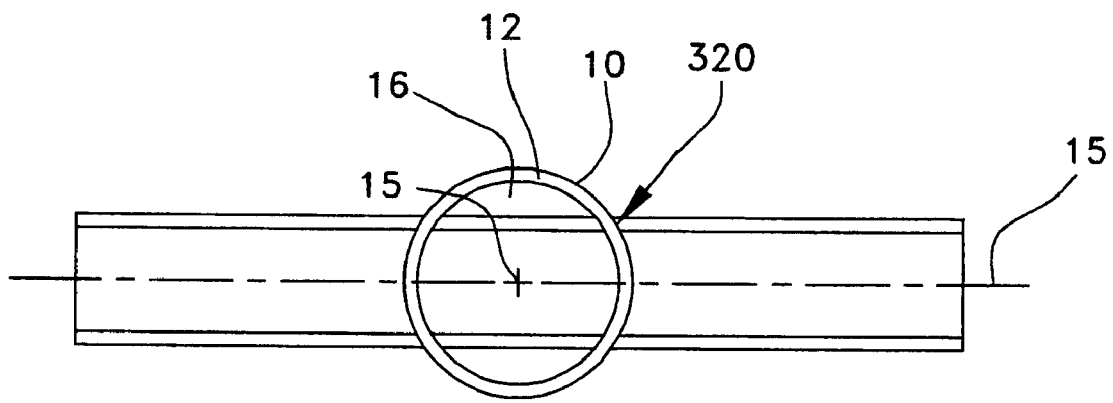
FIG. 17a is a cross-sectional view of the plunge cut joint showing the circular shape of the openings when seen from this view.
Figure 17B:
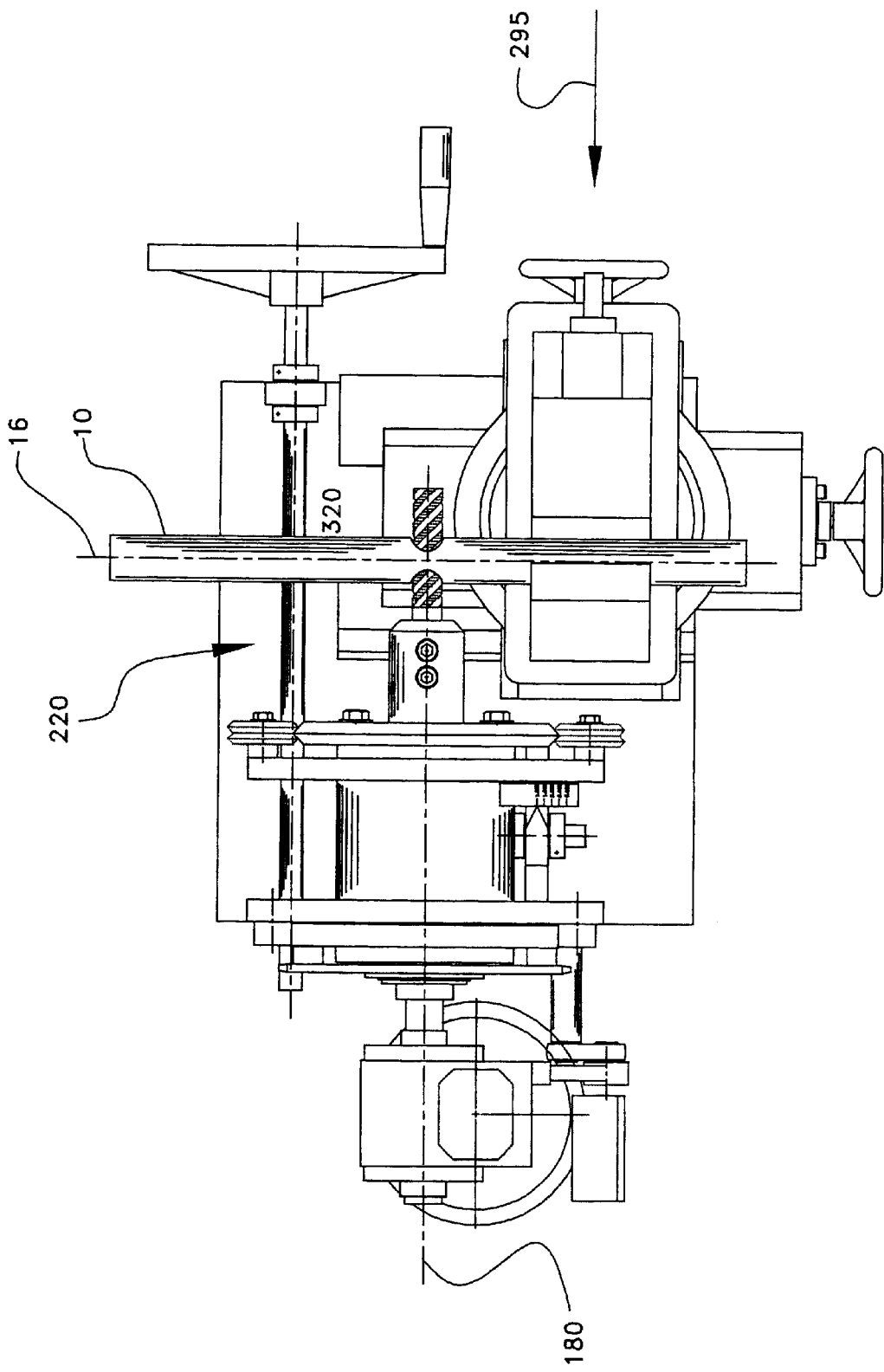
FIG. 17b is a top view showing the notching machine forming a plunge cut.

A tube 10 with openings formed by a plunge cut 320 is shown flushly receiving another tube in FIGS. 17 and 17a. The notching machine forms a plunge cut 320 through the sidewalls 12 of a tube 10 as shown in FIG. 17b. This type of cut is possible because the hub 90, spindle 161 and tool 170 can be offset to orbit through a circular path of travel 225 as the cut is being made. The cutting surface 172 at the front edge of the tool 170 initially engages and begins cutting the sidewall 12 of the tube 10. The orbiting path 225 prevents the blunt end 171 of the tool 10 from initially impacting the sidewall 12 of the tube 10 and acting as a stop that prevents a cut from being formed.

Figure 18:
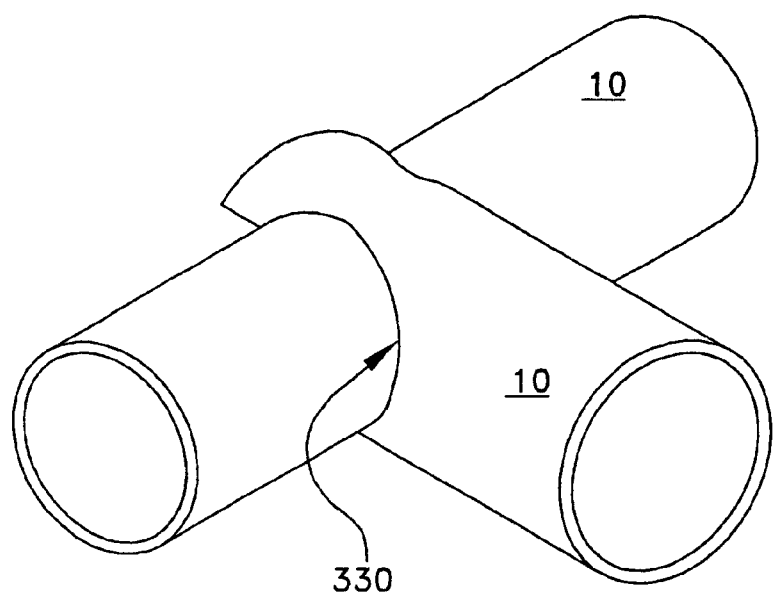
FIG. 18 is a perspective view of a snap fit joint formed by a larger diameter tube having a notch formed in its end to flushly receive and snap fit around the sidewall of a smaller tube.
Figure 18A:
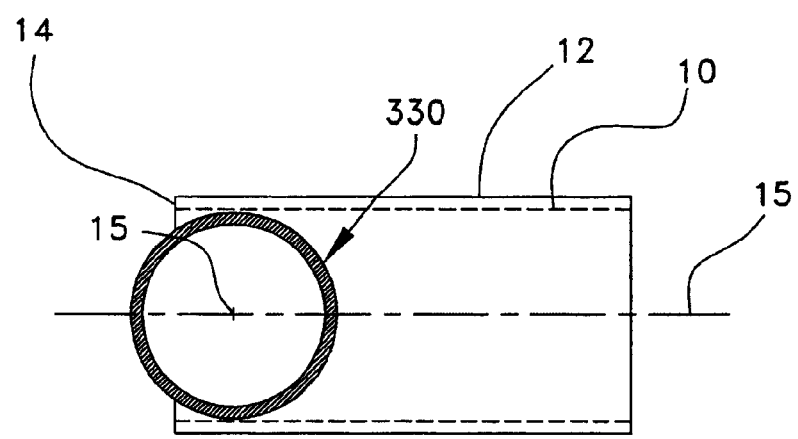
FIG. 18a is a cross-sectional view of the snap fit joint showing the slightly greater than a semi-circular shape of the notch when seen from this view.

The notching machine 20 is capable of forming a snap fit notch 330 in the end 14 of a tube 10 as shown in FIGS. 18 and 18a. The end 14 with the snap fit notch is snap fit around the sidewall 12 of another tube 10. This snap fit notch 330 can be easily formed in a number of ways. One way is to taking two or three passes at the end 14 of the tube 10 with a single tool 170. During the first pass, the offset mechanism is brought to or near its home position 210. A slot is then formed in the end of the tube via moving the cross slide table 51 along a desired path of travel 295. The offset mechanism 200 is then adjusted to offset the hub 90 and spindle 161 so that they travel in a circular path of travel 225 to form a notch with a radius slightly less than that of the tube being notched.

Figure 19A:
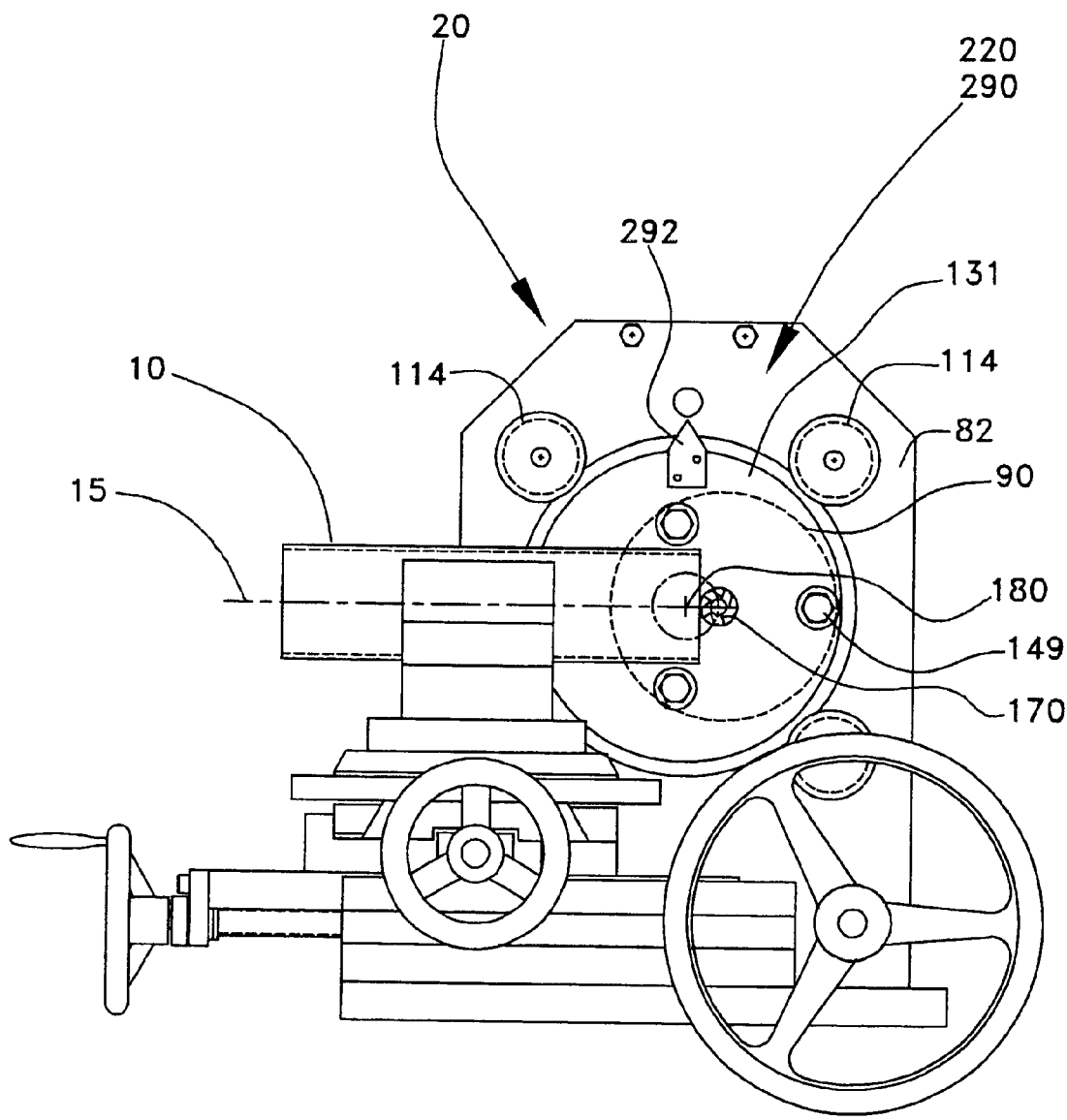
FIG. 19a is a front view showing a tube aligned and fixed in a desired position prior to forming a snap-fit notch, the axis of the tube being offset from the axis of the hub rotation assembly, and the hub, spindle and tool in a home position.
Figure 19B:
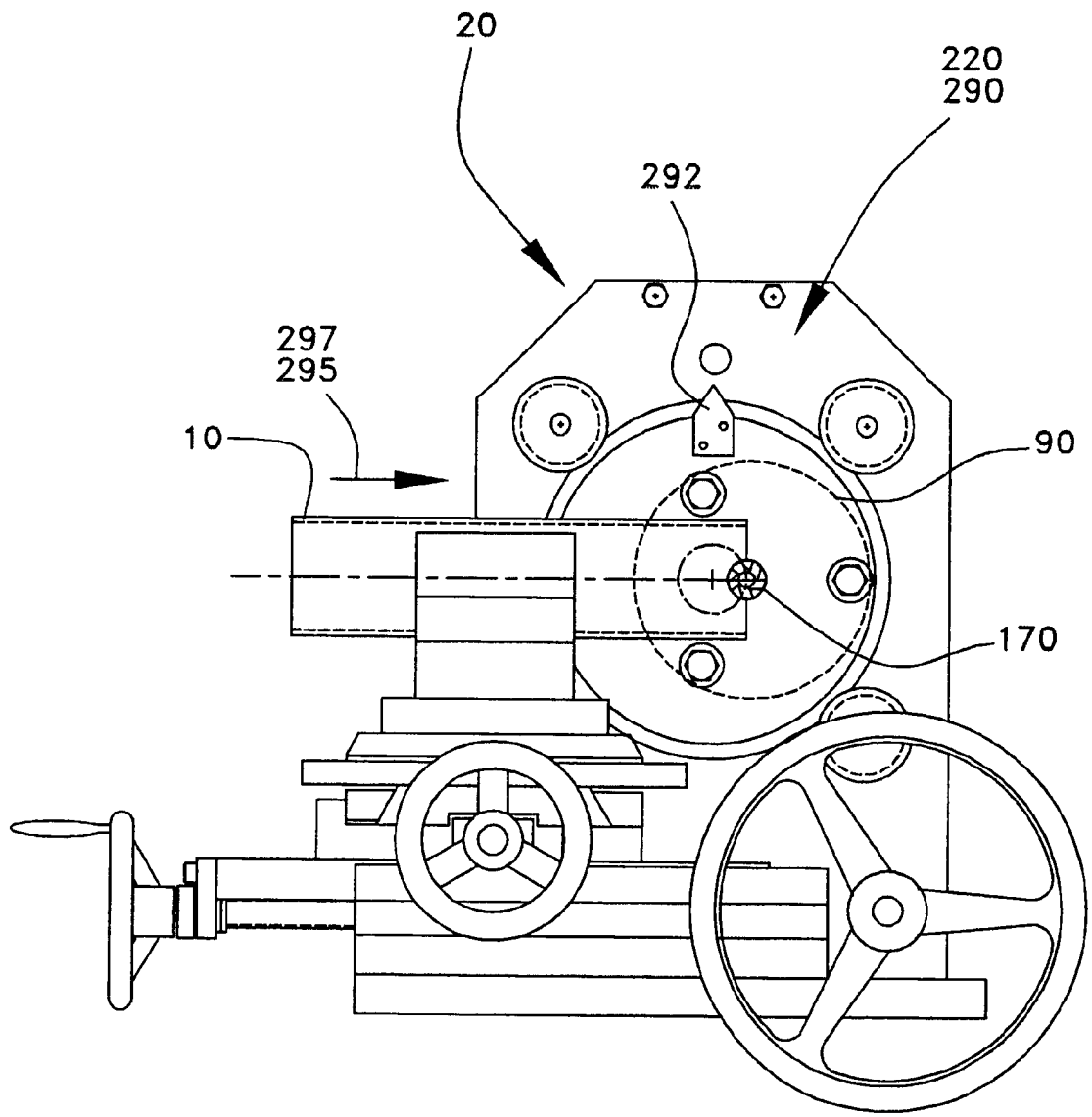
FIG. 19b is a front view showing the tube being advance or feed into the tool a predetermined distance to form a centrally located slot in the end of the tub, and the hub, spindle and tool remaining in the home position.
Figure 19C:
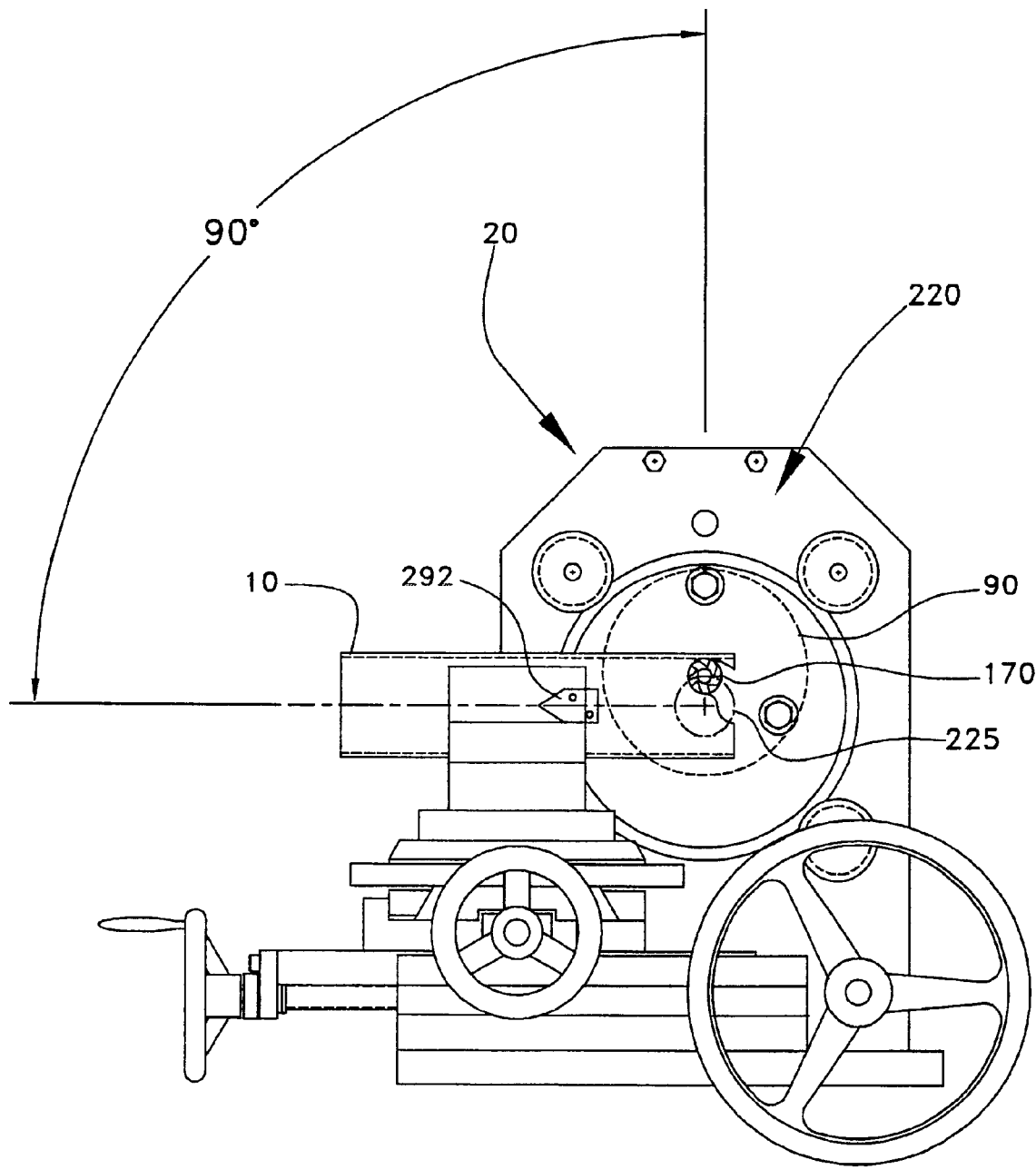
FIG. 19c is a front view showing the hub, spindle and tool advanced 90° from their home position, with the tool beginning to form the contour of the snap-fit notch.
Figure 19D:
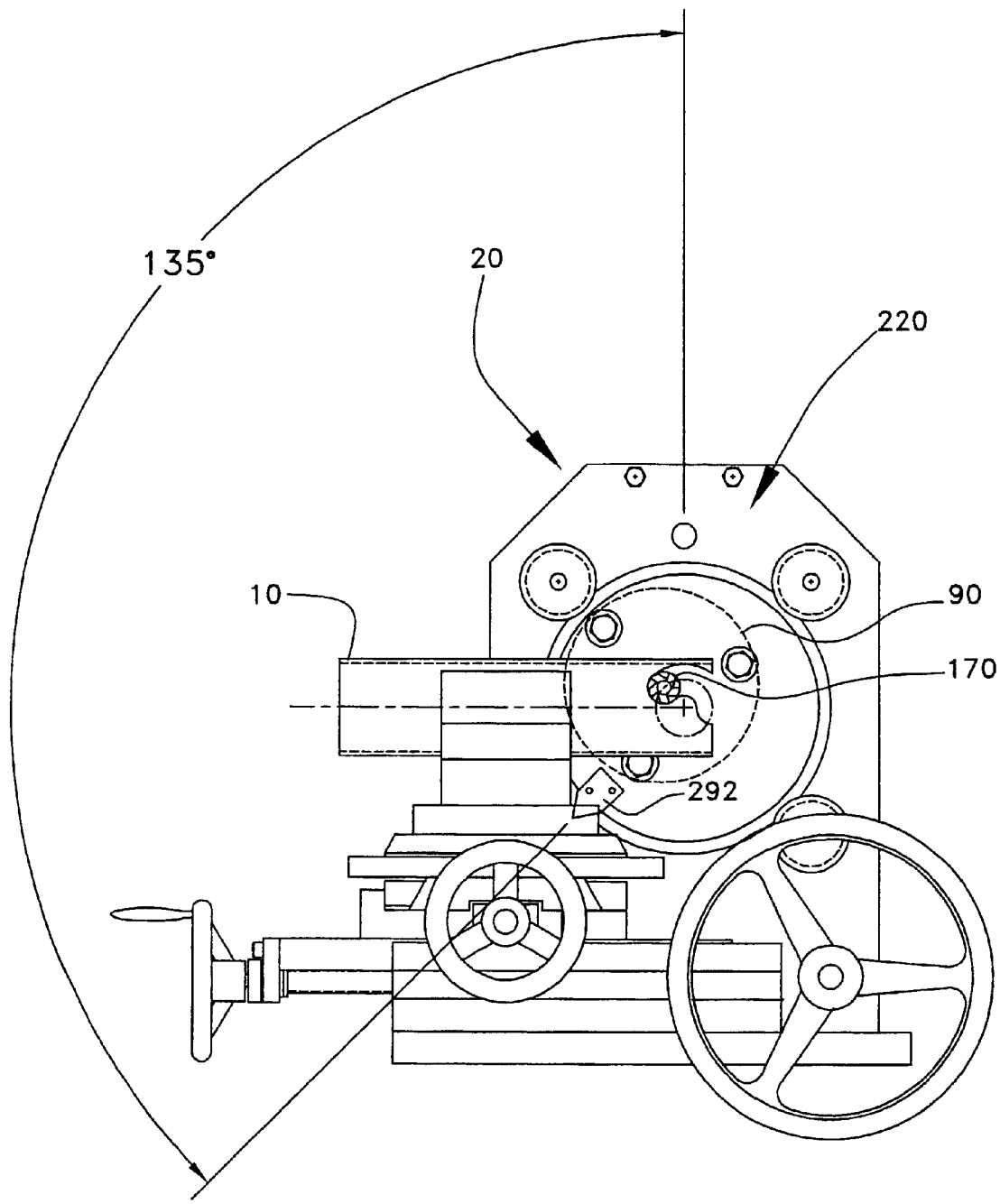
FIG. 19d is a front view showing the hub, spindle and tool advanced 135° from heir home position, with the tool continuing to form the snap-fit notch.
Figure 19E:
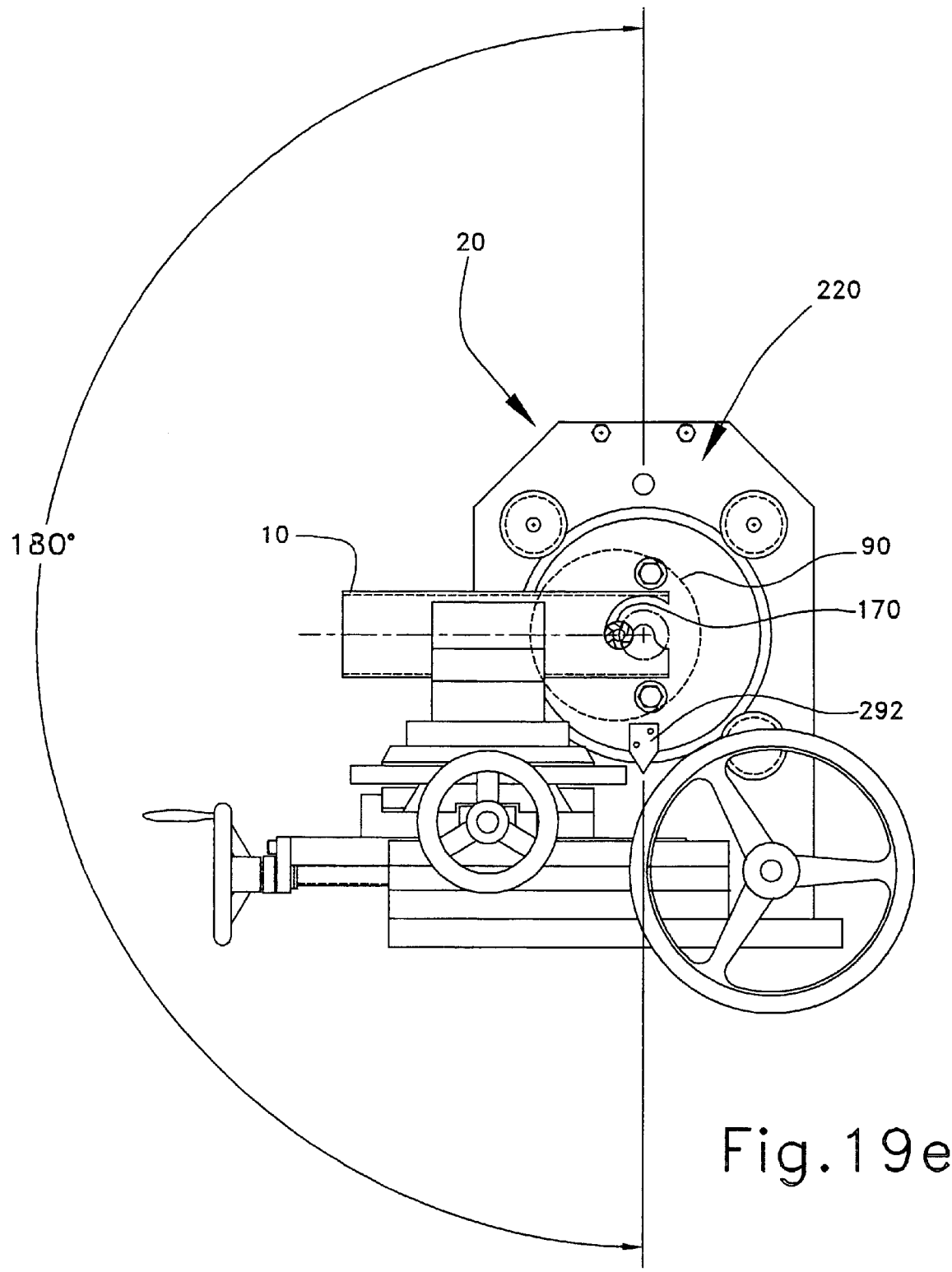
FIG. 19e is a front view showing the hub, spindle and tool advanced 180° from their home position.
Figure 19F:
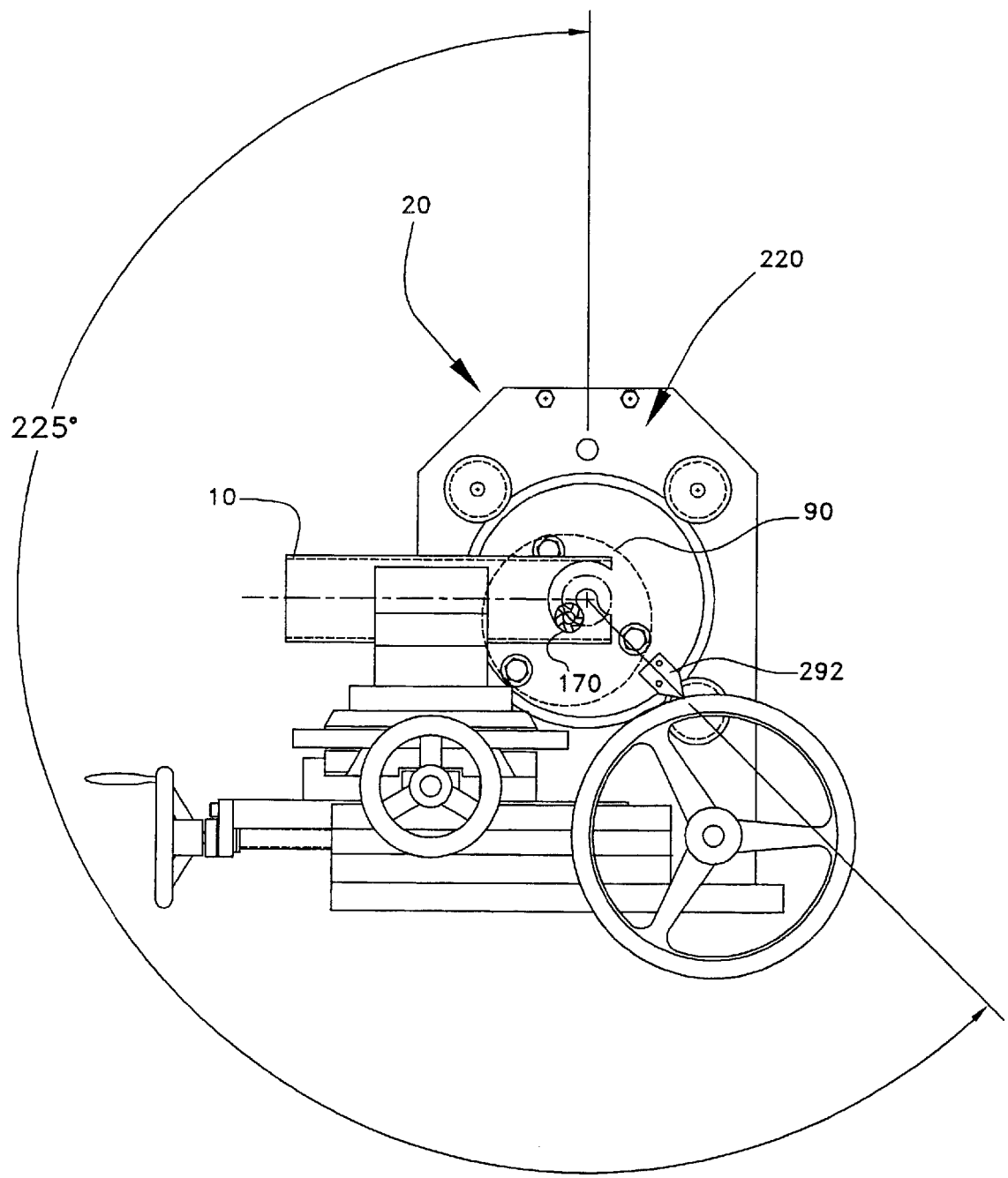
FIG. 19f is a front view showing the hub, spindle and tool advanced 225° from their home position.
Figure 19G:
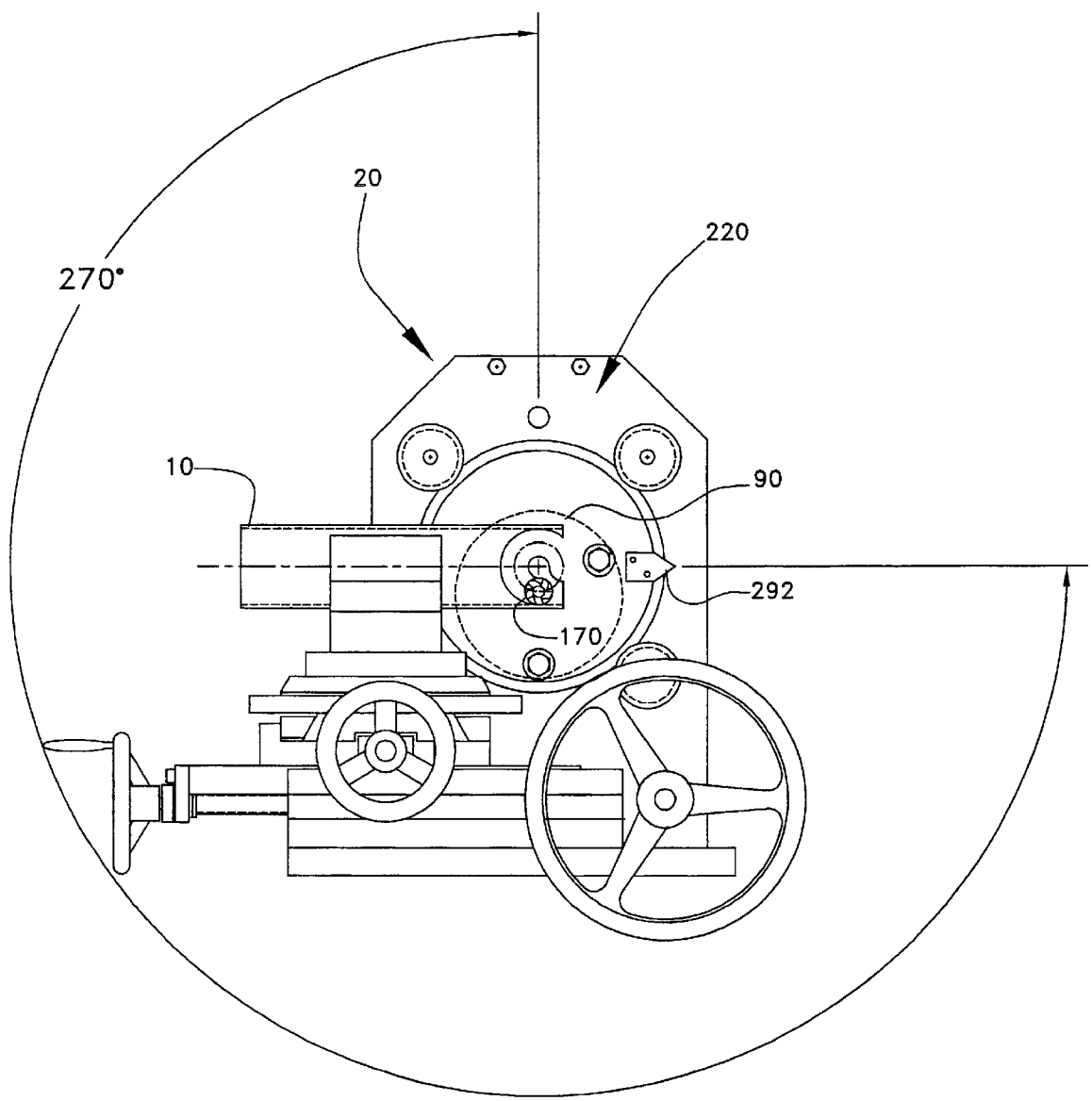
FIG. 19g is a front view showing the hub, spindle and tool advanced 270° from their home position.
Figure 19H:
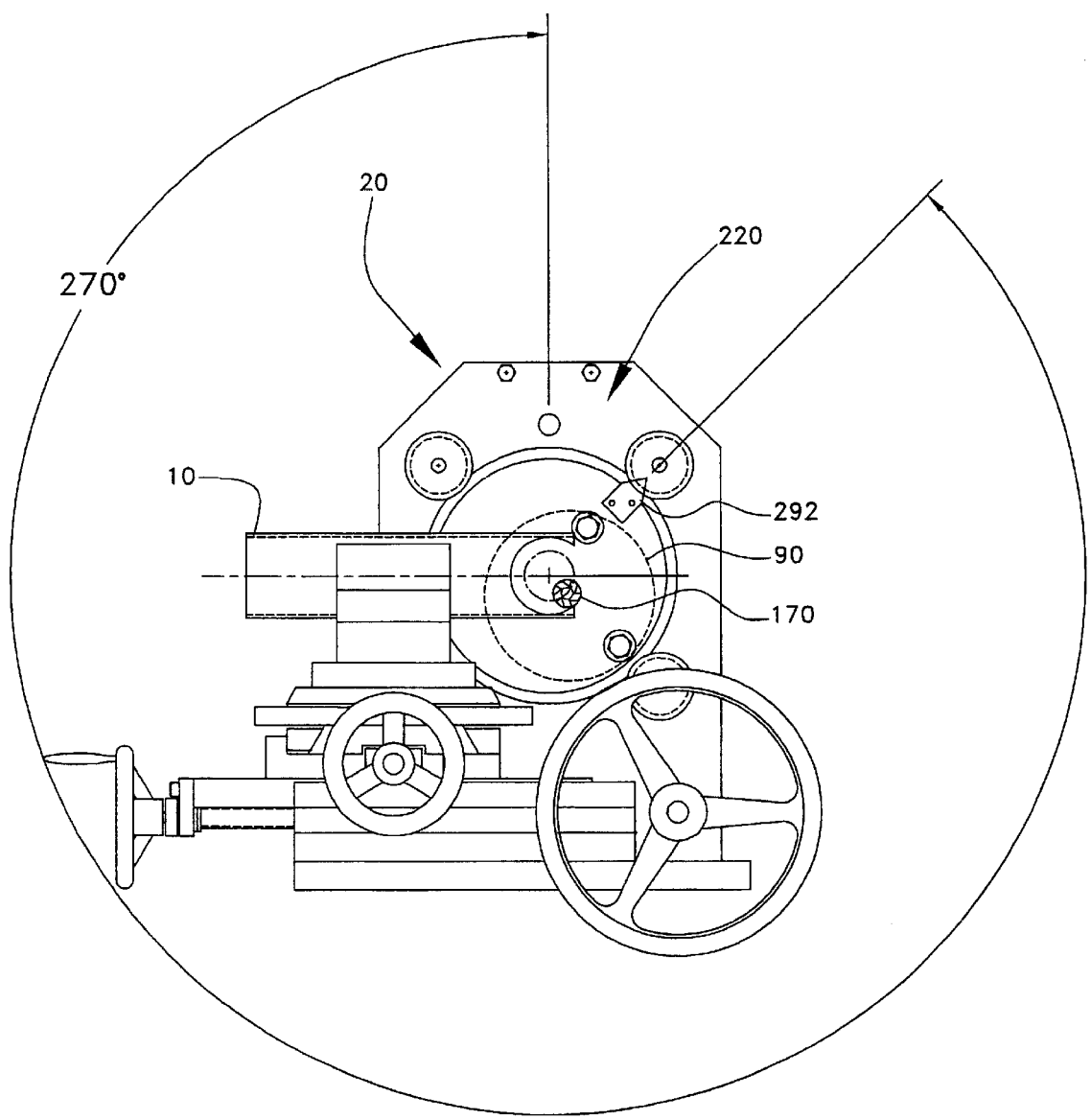
FIG. 19h is a front view showing the hub, spindle and tool advanced 315° from their home position, with the snap fit notch just about complete.
Figure 19I:
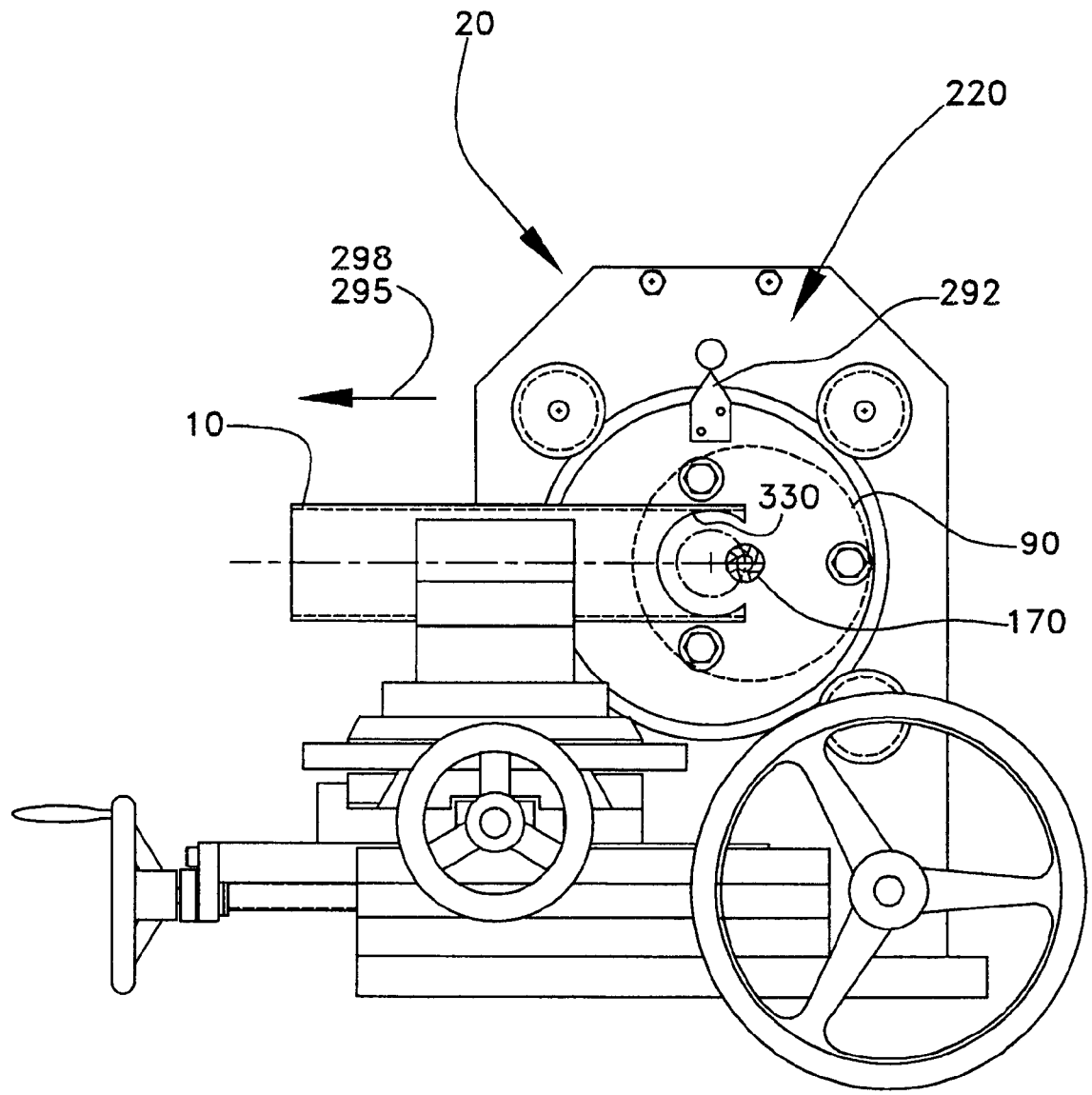
FIG. 19i is a front view showing the hub, spindle and tool advanced 360° with the snap fit notch complete.

A second way of forming the snap fit notch 330 is shown in FIGS. 19a through 19i. The machine 20 is set to an offset position 220, and brought to its home position 290 where the common axis of the hub 90, spindle 161 and tool 170 are offset from but in horizontal planar alignment with the central axis 120 of the rotation assembly 110, as in FIG. 19a. The tube 10 is then aligned with the tool 170 so that the center of the tool 15 is horizontally planar to the common axis 180 of the tool 170. The spindle drive motor 272 is turned on so that the spindle 161 and tool 170 rotate about their common axis 180. Then the cross slide table 51 is used to moved the tube 10 in a path of travel 297 so that its end 14 is feed a predetermined distance into the tool 170, as shown in FIG. 19b. The hand wheel 252 of the hub drive mechanism 250 is then used to rotate the rotation assembly 110 completely around its central axis 120. This causes the hub 90, spindle 161 and tool 170 to orbit or move in a circular path of travel 225 around the central axis 120 to form the snap-fit notch 330, as shown in FIGS. 19c through 19i. The cross slide table 51 is then moved in an opposite path of travel 298 to remove the tool 170, which is still partially inside the newly formed snap fit notch 330.

While the invention has been described with reference to a preferred embodiment, it will be understood by those skilled in the art that various changes may be made and equivalents may be substituted without departing from the broader aspects of the invention.

I claim:

1. A notching machine that uses a tool to form a notch in a workpiece, said notching machine comprising:

a workpiece positioning assembly having a gripping device adapted to grip and hold the workpiece in a desired position;

a hub and spindle assembly having a hub and spindle, said hub carrying said spindle and said spindle carrying the tool, said hub, spindle and tool having a common axis, and said spindle and tool being rotatable about said common axis;

a rotation assembly for rotatably supporting said hub, said rotation assembly having a central axis of rotation, said rotation assembly being adapted to allow said hub and spindle to rotate about said central axis, said common axis being substantially parallel to said central axis;

an offset mechanism having a portion that engages one of either said hub and said spindle, said offset mechanism selectively offsetting said common axis a predetermined offset distance from said central axis, said offset mechanism offsetting said common axis in a substantially linear manner relative to said central axis;

a spindle drive mechanism adapted to engage and rotate said spindle and tool about their said common axis; and, a hub drive mechanism adapted to rotate said hub, spindle and tool about said central axis of said rotation assembly, said hub, spindle and tool orbiting around said central axis, and said tool engaging and forming a notch in the workpiece as said hub is rotated about said central axis.

2. A notching machine that uses a tool to form a notch in a workpiece, said notching machine comprising:

a workpiece positioning assembly having a gripping device adapted to grip and hold the workpiece in a desired position;

a hub and spindle assembly having a hub and spindle, said hub carrying said spindle and said spindle carrying the tool, said hub, spindle and tool having a common axis, and said spindle and tool being rotatable about said common axis;

a rotation assembly for rotatably supporting said hub, said rotation assembly having a central axis of rotation, said rotation assembly being adapted to allow said hub and spindle to rotate about said central axis, said common axis being substantially parallel to said central axis, said rotation assembly includes several spaced rollers and a disc with a circular outer end, said rollers defining a first center point located on said central axis, each of said rollers engaging said outer end of said disc, said rollers rotatably supporting said disc, and said disc rotatably supporting said hub;

an offset mechanism having a portion that engages one of either said hub and said spindle, said offset mechanism selectively offsetting said common axis a predetermined offset distance from said central axis;

a spindle drive mechanism adapted to engage and rotate said spindle and tool about their said common axis; and, a hub drive mechanism adapted to rotate said hub, spindle and tool about said central axis of said rotation assembly, said hub, spindle and tool orbiting around said central axis, and said tool engaging and forming a notch in the workpiece as said hub is rotated about said central axis.

3. The notching machine of claim 2, and wherein said rollers are guide rollers and said disc is a guide disc, each guide roller having an outer end with a groove, and said outer end of said guide disc being shaped to rotatably mate with said groove of each of said guide rollers.

4. The notching machine of claim 3, and wherein said rotation assembly includes several spaced cam rollers and a support disc with a circular outer surface, said cam rollers defining a second center point, said first and second center points defining said central axis, each cam roller engaging said outer surface of said support disc, said cam rollers rotatably supporting said support disc, said support disc rotatably supporting said hub, and said hub being positioned between said guide and support discs.

5. The notching machine of claim 4, and wherein said hub has front and rear surfaces and a cavity extending from said front to said rear surface, said cavity being adapted to rotatably receive and support said spindle, and each of said guide and support discs having an opening, said spindle extending through said openings in said guide and support discs.

6. The notching machine of claim 1, and further comprising a frame, and wherein said workpiece positioning assembly, rotation assembly, spindle drive mechanism and hub drive mechanism are mounted to said frame.

7. A notching machine that uses a tool to form a notch in a workpiece, said notching machine comprising:

a workpiece positioning assembly having a gripping device adapted to grip and hold the workpiece in a desired position;

a hub and spindle assembly having a hub and spindle, said hub carrying said spindle and said spindle carrying the tool, said hub, spindle and tool having a common axis, and said spindle and tool being rotatable about said common axis;

a rotation assembly for rotatably supporting said hub, said rotation assembly having a central axis of rotation, said rotation assembly being adapted to allow said hub and spindle to rotate about said central axis, said common axis being substantially parallel to said central axis;

an offset mechanism having a portion that engages one of either said hub and said spindle, said offset mechanism selectively offsetting said common axis a predetermined offset distance from said central axis;

a spindle drive mechanism adapted to engage and rotate said spindle and tool about their said common axis, said spindle drive mechanism including a motor with a drive shaft linked to said spindle, said motor being movingly mounted to said frame to move in unison with said spindle as said spindle orbits around said central axis of said hub; and a hub drive mechanism adapted to rotate said hub, spindle and tool about said central axis of said rotation assembly, said hub, spindle and tool orbiting around said central axis, and said tool engaging and forming a notch in the workpiece as said hub is rotated about said central axis.

8. The notching machine of claim 7, and wherein said motor is linked via a gear reducer to said spindle, and said drive shaft of said motor is substantially perpendicular to said common axis of said spindle and tool, said motor being carried by said spindle, and said motor being mounted to said frame by a double pivoting torque bar assembly.

9. The notching machine of claim 1, and wherein the workpiece has an end, and said positioning assembly positions the end of the workpiece relative to said tool, and said notch is formed in the end of the workpiece.

10. The notching machine of claim 1, and wherein the workpiece has an axis, and said positioning assembly has a height adjustment device, and said height adjustment device is adapted to move the axis of the workpiece into horizontally alignment with said common axis to form a full length notch.

11. The notching machine of claim 1, and wherein the workpiece has an axis, and said positioning assembly has a height adjustment device, and said height adjustment device is adapted to move the axis of the workpiece out of horizontally alignment with said common axis to form an offset notch.

12. The notching machine of claim 1, and wherein the workpiece has a sidewall, and said positioning assembly positions the sidewall of the workpiece relative to said tool, and said notch is formed in the sidewall of the workpiece.

13. The notching machine of claim 12, and wherein said positioning assembly includes a cross slide table movable along a path of travel, said cross slide table is adapted to selectively move the sidewall of the workpiece toward the tool to form a plunge cut.

14. The notching machine of claim 13, and wherein said gripping mechanism is a vice having a pair of jaws, one of said jaws being selectively movable to grip the sidewall of the workpiece between said jaws.

15. The notching machine of claim 1, and wherein said offset mechanism includes an offset screw, said offset screw threadably engaging said hub, said offset screw being adapted to push said hub into an offset position and to pull said hub to a home position.

16. The notching machine of claim 1, and wherein said hub drive mechanism includes a hand wheel for manual operation.

17. A method of forming a snap-fit notch in a workpiece, said method of forming a snap-fit notch comprising the steps of:

providing a notching machine having a workpiece positioning mechanism, a spindle with a tool that rotates about a common axis, a rotation assembly defining a central axis, said rotation assembly being adapted to selectively rotate said spindle and tool about an arcuate path of travel around said central axis;

securing the workpiece to said workpiece positioning mechanism;

aligning the workpiece with said tool;

cutting a slot in the workpiece by moving one of the workpiece and said tool along a substantially linear path of travel;

while said tool remains in said slot, rotating said spindle and tool about said arcuate path of travel via said rotation assembly to form a snap fit notch in the workpiece.

18. The method of forming a snap-fit notch of claim 17, and wherein said tool remains in said slot when said spindle and tool are rotated about said arcuate path of travel.

19. The method of forming a snap-fit notch of claim 17, and wherein the workpiece has a given diameter that define top and bottom margins of the workpiece, and said notching machine includes an adjustable offset mechanism, said adjustable offset mechanism being adapted to alter said arcuate path of travel of said tool, and further including the step of adjusting said offset mechanism to move said tool about an adjusted arcuate path of travel that remains within the top and bottom margins of the workpiece.

* * * * *